US011710843B2

(12) United States Patent
Evans et al.

(10) Patent No.: US 11,710,843 B2
(45) Date of Patent: Jul. 25, 2023

(54) REDOX FLOW BATTERY AND BATTERY SYSTEM

(71) Applicant: ESS Tech, Inc., Wilsonville, OR (US)

(72) Inventors: Craig E. Evans, West Linn, OR (US); Sean Casey, Portland, OR (US); Thiago Groberg, Tigard, OR (US); Yang Song, West Linn, OR (US)

(73) Assignee: ESS Tech, Inc., Wilsonville, OR (US)

( * ) Notice: Subject to any disclaimer, the term of this patent is extended or adjusted under 35 U.S.C. 154(b) by 184 days.

(21) Appl. No.: 17/308,862

(22) Filed: May 5, 2021

(65) Prior Publication Data

US 2021/0359328 A1    Nov. 18, 2021

Related U.S. Application Data

(60) Provisional application No. 63/025,229, filed on May 15, 2020.

(51) Int. Cl.
*H01M 8/18*  (2006.01)
*H01M 8/2455*  (2016.01)

(52) U.S. Cl.
CPC ......... *H01M 8/188* (2013.01); *H01M 8/2455* (2013.01)

(58) Field of Classification Search
CPC .. H01M 8/188; H01M 8/2455; H01M 8/0258; H01M 8/0273; H01M 8/0297; H01M 8/04186

See application file for complete search history.

(56) References Cited

U.S. PATENT DOCUMENTS

| 6,503,653 | B2 | 1/2003 | Rock | |
|---|---|---|---|---|
| 2004/0209150 | A1 | 10/2004 | Rock et al. | |
| 2006/0127706 | A1 | 6/2006 | Goebel et al. | |
| 2007/0031719 | A1* | 2/2007 | Ishioka | H01M 8/028 429/492 |
| 2010/0273042 | A1* | 10/2010 | Buck | H01M 10/6551 429/120 |
| 2015/0111125 | A1* | 4/2015 | Farrington | H01M 8/241 429/479 |
| 2016/0079624 | A1* | 3/2016 | Brantley | H01M 8/20 429/418 |

(Continued)

FOREIGN PATENT DOCUMENTS

WO    2015070066 A1    5/2015

OTHER PUBLICATIONS

ISA Korean Intellectual Property Office, International Search Report and Written Opinion Issued in Application No. PCT/US/2021/031190, dated Aug. 24, 2021, WIPO, 12 pages.

(Continued)

*Primary Examiner* — Stewart A Fraser
(74) *Attorney, Agent, or Firm* — McCoy Russell LLP

(57) ABSTRACT

A redox flow battery and battery system are provided. In one example, the redox flow battery includes a cell stack assembly interposed by two endplates and comprising a plurality of mated membrane frame plates and bipolar frame plates forming, at a mated interface, a plurality of negative and positive flow channels configured to distribute negative and positive electrolyte into a plurality of bipolar plates. In the battery a membrane is coupled to each of the plurality of membrane frame plates and positioned sequentially between two of the bipolar plates included in the plurality of bipolar plates.

19 Claims, 15 Drawing Sheets

(56) References Cited

U.S. PATENT DOCUMENTS

2016/0164112 A1* 6/2016 Seipp .................. H01M 8/0258
429/508
2017/0288243 A1 10/2017 Thomsen et al.
2018/0048000 A1 2/2018 Horde et al.

OTHER PUBLICATIONS

Casey, S. et al., "Redox Low Battery and Battery System," U.S. Appl. No. 17/308,843, filed May 5, 2021, 54 pages.
Evans, C. et al., "Redox Flow Battery and Battery System," U.S. Appl. No. 17/308,845, filed May 5, 2021, 48 pages.
Evans, C. et al., "Redox Flow Battery and Battery System," U.S. Appl. No. 17/308,873, filed May 5, 2021, 53 pages.
Evans, C. et al., "Electrode Assembly for a Redox Flow Battery," U.S. Appl. No. 17/308,913, 46 pages.

* cited by examiner

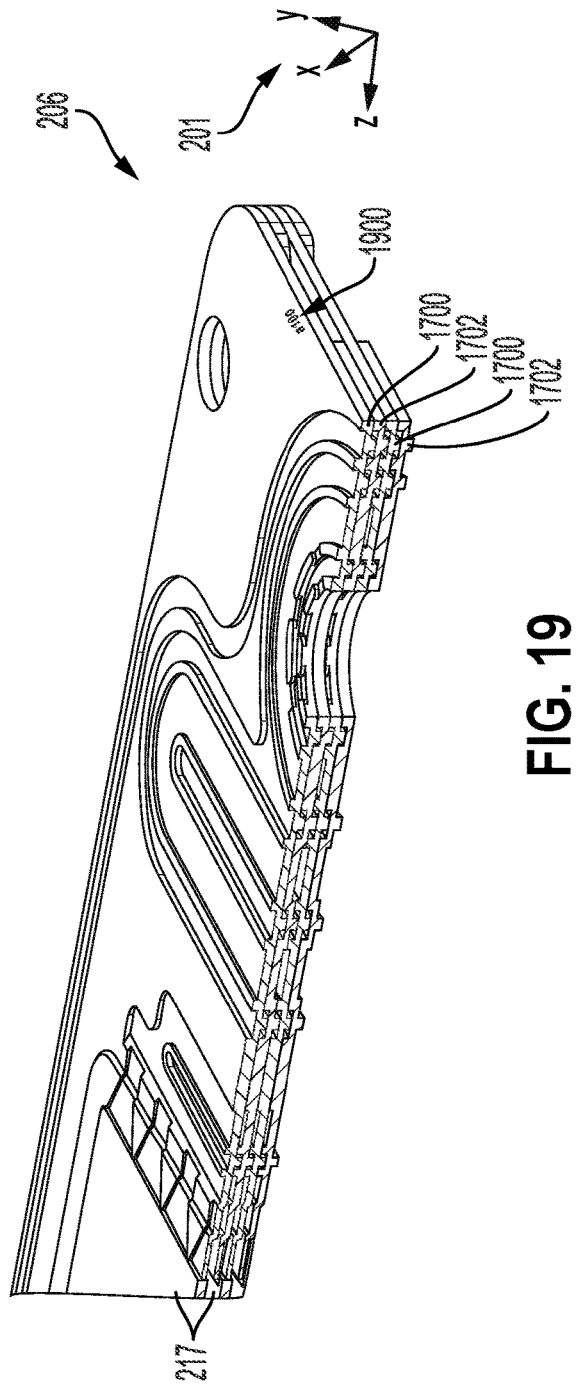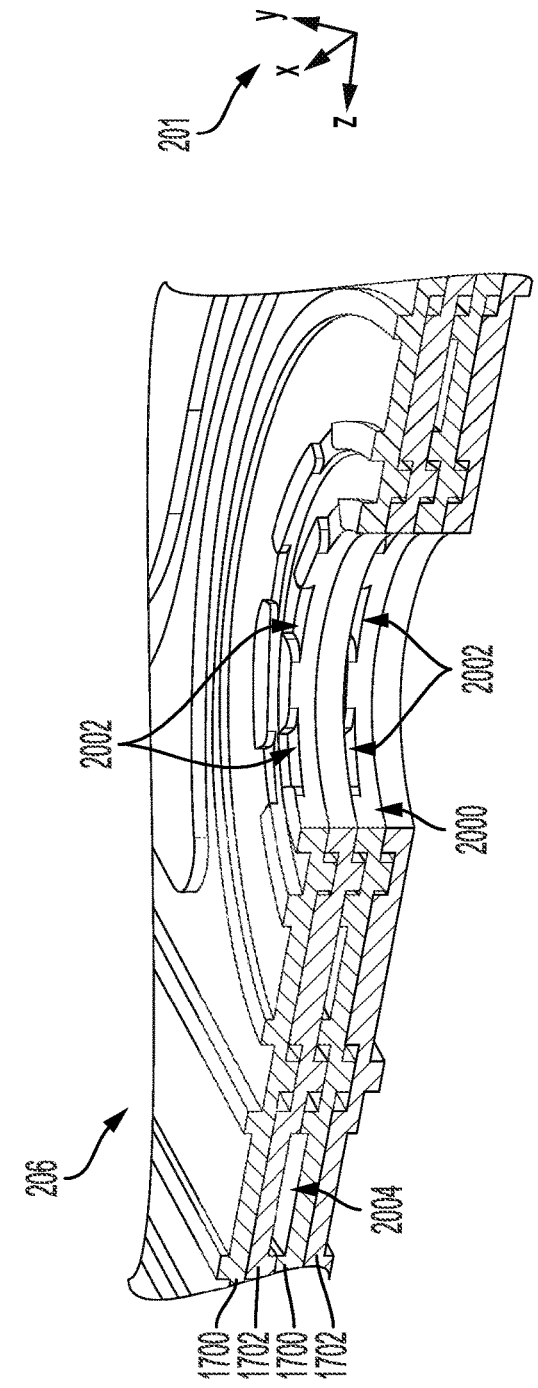
FIG. 19
FIG. 20

REDOX FLOW BATTERY AND BATTERY SYSTEM

CROSS-REFERENCE TO RELATED APPLICATION

The present application claims priority to U.S. Provisional Application No. 63/025,229, entitled "REDOX FLOW BATTERY AND BATTERY SYSTEM", and filed on May 15, 2020. The entire contents of the above-listed application are hereby incorporated by reference for all purposes.

FIELD

The present description relates generally to a redox flow battery and battery system.

BACKGROUND AND SUMMARY

Redox flow batteries are suitable for grid scale storage applications due to their capability for scaling power and capacity independently, as well as for charging and discharging over thousands of cycles with reduced performance losses in comparison to conventional battery technologies. Iron hybrid redox flow battery are particularly attractive due to the incorporation of low cost materials in the cell stack. The iron redox flow battery (IFB) relies on iron, salt, and water for electrolyte. These earth abundant and inexpensive materials in the IFB along with the omission of harsh chemicals, in some embodiments, reduces the battery's environmental footprint.

Cell stacks in previous flow batteries have exhibited space inefficiencies. Unwanted material warping (e.g., deflection) may also occur in the cell stack when in compression, restricting electrolyte flow and causing other unwanted electrolyte flow dynamics. Misalignment in cells in the stack may also occur during battery assembly, causing additional issues with electrolyte flow patterns. The space inefficiencies and cell stack deformation can present impediments to cell stack scaling, in some cases. Cell stack scaling may also exacerbate or give rise to misalignment of individual cells in the stack, due to cell manufacturing tolerances, manufacturing errors, etc., for example.

The inventors have recognized the abovementioned drawbacks of previous redox flow batteries and developed a redox flow battery to at least partially overcome the drawbacks. In one example, the redox flow battery includes a cell stack assembly interposed by two endplates and including a plurality of mated membrane frame plates and bipolar frame plates forming, at a mated interface, a plurality of negative and positive flow channels configured to distribute negative and positive electrolyte into a plurality of bipolar plates. In the redox flow battery, a membrane is coupled to each of the plurality of membrane frame plates and positioned sequentially between two of the bipolar plates included in the plurality of bipolar plates. In this way, a compact electrolyte flow pattern can be achieved in the cell stack, allowing for efficient scaling of the cell stack.

In one example, the plurality of negative and positive flow channels may be bounded by mated tongues and grooves and adhesive paths. The adhesive paths and tongues and grooves enable quicker cell stack assembly while also reducing the chance of electrolyte leakage in the stack.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 19-20 show a cross-section of another portion of the cell stack, depicted in FIG. 4, where membrane and bipolar frame plates are mated to form positive electrolyte flow paths.

FIGS. 2-23 are drawn approximately to scale. However, other relative dimensions may be used in other embodiments.

DETAILED DESCRIPTION

The following description relates to flow battery systems and manufacturing techniques serving to increase system compactness as well as reduce shunt currents in the battery cell stack. In one example, the flow battery system may include a cell stack having sequentially arranged bipolar and membrane frame assemblies with tongue and groove interfaces formed therebetween. The tongue and groove interfaces space efficiently delimit different electrolyte flow channels in the stack. Further in one example, the electrolyte flow channels may include serpentine shaped shunt channels configured to flow electrolyte therethrough. The serpentine shape allows the length of the shunt channels to be increased, thereby reducing shunt current generation during battery operation. The frame assemblies in the cell stack may also include nested alignment bosses. The alignment bosses allow for quick and efficient cell stack construction (e.g., simplified manufacturing automation) and reduce the likelihood of cell misalignment in the stack.

Figure 1:
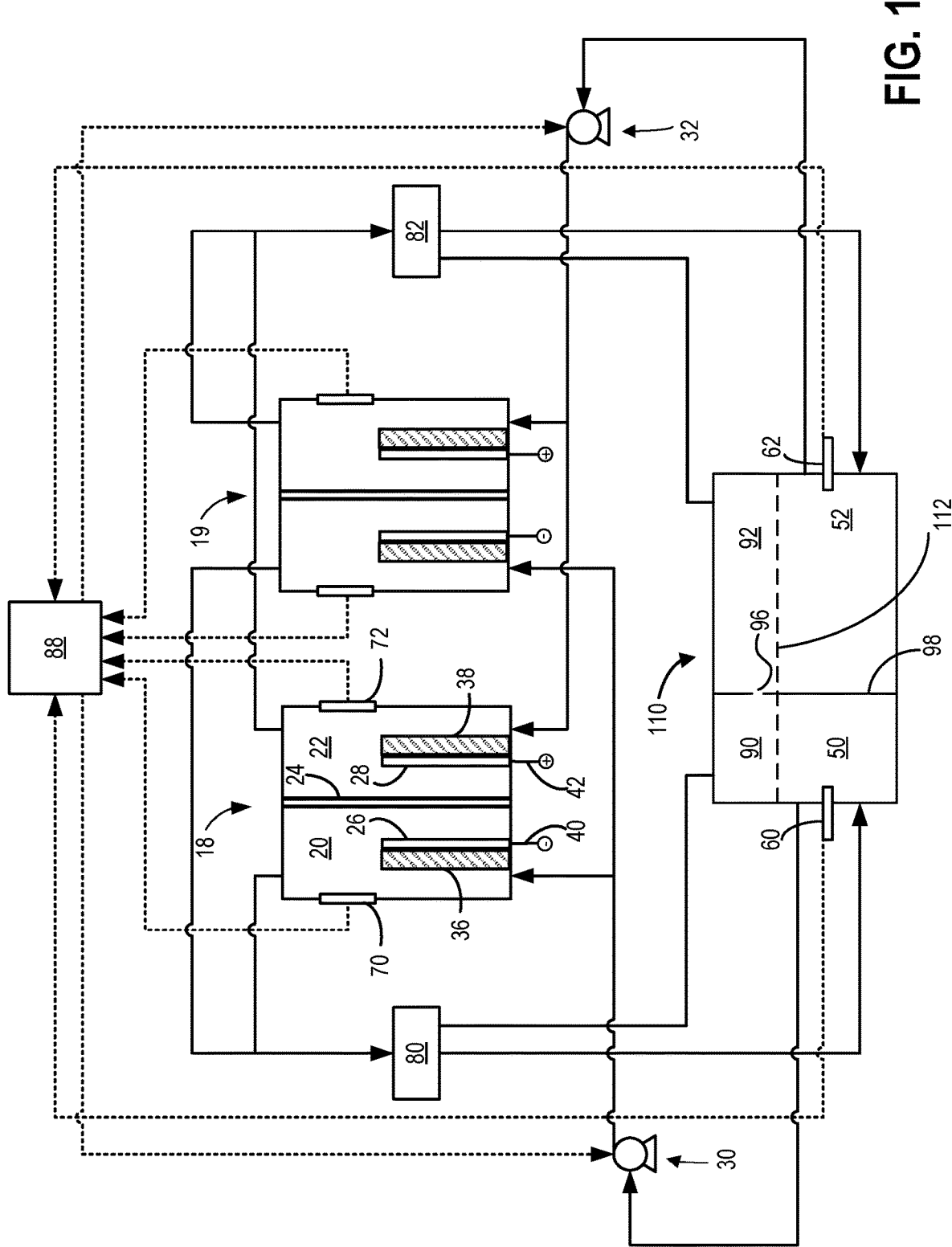
FIG. 1 shows a schematic of an exemplary redox flow battery system.

As shown in FIG. 1, in a redox flow battery system 10, a negative electrode 26 may be referred to as a plating electrode and a positive electrode 28 may be referred to as a redox electrode. A negative electrolyte within a plating side (e.g., a negative electrode compartment 20) of a first battery cell 18 may be referred to as a plating electrolyte, and a positive electrolyte on a redox side (e.g., a positive electrode compartment 22) of the first battery cell 18 may be referred to as a redox electrolyte.

Hybrid redox flow batteries are redox flow batteries that are characterized by the deposition of one or more of the electroactive materials as a solid layer on an electrode. Hybrid redox flow batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid battery systems, the charge capacity (e.g., a maximum amount of energy stored) of the redox battery may be limited by the amount of metal plated during battery charge and may depend on the efficiency of the plating system as well as the available volume and surface area available for plating.

Anode refers to the electrode where electroactive material loses electrons and cathode refers to the electrode where electroactive material gains electrons. During battery charge, the positive electrolyte gains electrons at the negative electrode 26, therefore the negative electrode 26 is the cathode of the electrochemical reaction. During discharge, the positive electrolyte loses electrons; therefore, the negative electrode 26 is the anode of the reaction. Alternatively, during discharge, the negative electrolyte and negative electrode may be respectively referred to as an anolyte and anode of the electrochemical reaction, while the positive electrolyte and the positive electrode may be respectively referred to as a catholyte and cathode of the electrochemical reaction. During charge, the negative electrolyte and negative electrode may be respectively referred to as the catholyte and cathode of the electrochemical reaction, while the positive electrolyte and the positive electrode may be respectively referred to as the anolyte and anode of the electrochemical reaction. For simplicity, the terms positive and negative are used herein to refer to the electrodes, electrolytes, and electrode compartments in redox battery flow systems.

One example of a hybrid redox flow battery is an all iron redox flow battery (IFB), in which the electrolyte includes iron ions in the form of iron salts (e.g., $FeCl_2$, $FeCl_3$, and the like), wherein the negative electrode includes metal iron. For example, at the negative electrode 26, ferrous ion, $Fe^{2+}$, receives two electrons and plates as iron metal on to the negative electrode 26 during battery charge, and iron metal, $Fe^0$, loses two electrons and re-dissolves as $Fe^{2+}$ during battery discharge. At the positive electrode, $Fe^{2+}$ loses an electron to form ferric ion, $Fe^{3+}$, during charge, and during discharge $Fe^{3+}$ gains an electron to form $Fe^{2+}$. The electrochemical reaction is summarized in equations (1) and (2), wherein the forward reactions (left to right) indicate electrochemical reactions during battery charge, while the reverse reactions (right to left) indicate electrochemical reactions during battery discharge:

$$Fe^{2+}+2e- \leftrightarrow Fe^0 -0.44 \text{ V (Negative Electrode)} \quad (1)$$

$$Fe^{2+} \leftrightarrow 2Fe^{3+}+2e- +0.77 \text{ V (Positive Electrode)} \quad (2)$$

As discussed above, the negative electrolyte used in the IFB may provide a sufficient amount of $Fe^{2+}$ so that, during charge, $Fe^{2+}$ can accept two electrons from the negative electrode to form $Fe^0$ and plate onto a substrate. During discharge, the plated $Fe^0$ may then lose two electrons, ionizing into $Fe^{2+}$ and may be dissolved back into the electrolyte. The equilibrium potential of the above reaction is −0.44 V and thus, this reaction provides a negative terminal for the desired system. On the positive side of the IFB, the electrolyte may provide $Fe^{2+}$ during charge which loses an electron and oxidizes to $Fe^{3+}$. During discharge, $Fe^{3+}$ provided by the electrolyte becomes $Fe^{2+}$ by absorbing an electron provided by the electrode. The equilibrium potential of this reaction is +0.77 V, creates a positive terminal for the desired system.

The IFB provides the ability to charge and recharge its electrolytes in contrast to other battery types utilizing non-regenerating electrolytes. Charge is achieved by applying a current across the electrodes via terminals 40 and 42. The negative electrode 26 may be electrically coupled via terminal 40 to the negative side of a voltage source so that electrons may be delivered to the negative electrolyte via the positive electrode (e.g., as $Fe^{2+}$ is oxidized to $Fe^{3+}$ in the positive electrolyte in the positive electrode compartment 22). The electrons provided to the negative electrode 26 (e.g., plating electrode) can reduce the $Fe^{2+}$ in the negative electrolyte to form $Fe^0$ at the plating substrate, causing it to plate onto the negative electrode 26.

Discharge can be sustained while $Fe^0$ remains available to the negative electrolyte for oxidation and while $Fe^{3+}$ remains available in the positive electrolyte for reduction. As an example, $Fe^{3+}$ availability can be maintained by increasing the concentration or the volume of the positive electrolyte to the positive electrode compartment 22 side of the first battery cell 18 to provide additional $Fe^{3+}$ ions via an external source, such as an external positive electrolyte tank 52. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{2+}$ in the negative electrode compartment 20. As an example, $Fe^{2+}$ availability can be maintained by providing additional $Fe^{2+}$ ions via an external source, such as an external negative electrolyte chamber 50 to increase the concentration or the volume of the negative electrolyte to the negative electrode compartment 20 side of the first battery cell 18.

In an IFB, the positive electrolyte includes ferrous ion, ferric ion, ferric complexes, or any combination thereof, while the negative electrolyte includes ferrous ion or ferrous complexes, depending on the state of charge of the IFB system. As previously mentioned, utilization of iron ions in both the negative electrolyte and the positive electrolyte allows for utilization of the same electrolytic species on both sides of the battery cell, which can reduce electrolyte cross-contamination and can increase the efficiency of the IFB system, resulting in less electrolyte replacement as compared to other redox flow battery systems.

Efficiency losses in an IFB may result from electrolyte crossover through a separator 24 (e.g., ion-exchange membrane barrier, micro-porous membrane, and the like). For example, ferric ions in the positive electrolyte may be driven toward the negative electrolyte by a ferric ion concentration gradient and an electrophoretic force across the separator. Subsequently, ferric ions penetrating the membrane barrier and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) may result in precipitation of $Fe(OH)_3$. Precipitation of $Fe(OH)_3$ may degrade the separator 24 and cause permanent battery performance and efficiency losses. For example, $Fe(OH)_3$ precipitate may chemically foul the organic functional group of an ion-exchange membrane or physically clog the small micro-pores of an ion-exchange membrane. In either case, due to the $Fe(OH)_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, contributing to additional processing costs and complexity. Alternatively, adding specific organic acids to the positive electrolyte and the negative electrolyte in response to electrolyte pH changes may mitigate precipitate formation during battery charge and discharge cycling without driving up overall costs. Additionally, implementing a membrane barrier that inhibits ferric ion cross-over may also mitigate fouling.

Additional coulombic efficiency losses may be caused by reduction of $H^+$ (e.g., protons) and subsequent formation of $H_2$ (e.g., hydrogen gas), and the reaction of protons in the negative electrode compartment 20 with electrons supplied at the plated iron metal electrode to form hydrogen gas.

The IFB electrolyte (e.g., $FeCl_2$, $FeCl_3$, $FeSO_4$, $Fe_2(SO_4)_3$, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental impacts as compared with all other current advanced redox flow battery systems in production.

Continuing with FIG. 1, a schematic illustration of the redox flow battery system 10 is shown. The redox flow battery system 10 may include the first redox flow battery cell 18 fluidly connected to a multi-chambered electrolyte storage tank 110. The first redox flow battery may generally include the negative electrode compartment 20, separator 24, and positive electrode compartment 22. The separator 24 may include an electrically insulating ionic conducting barrier which prevents bulk mixing of the positive electrolyte and the negative electrolyte while allowing conductance of specific ions therethrough. For example, the separator 24 may include an ion-exchange membrane and/or a microporous membrane.

The negative electrode compartment 20 may include the negative electrode 26, and the negative electrolyte may include electroactive materials. The positive electrode compartment 22 may include the positive electrode 28, and the positive electrolyte may include electroactive materials. In some examples, multiple redox flow battery cells 18 may be combined in series or in parallel to generate a higher voltage or current in a redox flow battery system. For example, in some examples, the redox flow battery system 10 may include two cell stacks, as shown in FIGS. 10-13, where each cell stack is formed of multiple battery cells. As an example, the redox flow battery system 10 is depicted in FIG. 1 with the first battery cell 18 as well as a second battery cell 19, similarly configured to the first battery cell 18. As such, all components and processes described herein for the first battery cell 18 may be similarly found in the second battery cell 19.

The first battery cell 18 may be included in a first cell stack and the second battery cell 19 may be included in a second cell stack. The first and second cells may be fluidly coupled or not fluidly coupled to one another but are each fluidly coupled to the electrolyte storage tank 110 and rebalancing reactors 80, 82. For example, each of the first and second battery cells 18, 19 may be connected to negative and positive electrolyte pumps 30 and 32 via common passages that branch to each of the first and second battery cells 18 and 19, as shown in FIG. 1. Similarly, the battery cells may each have passages that merge into common passages coupling the battery cells to the rebalancing reactors 80, 82.

Further illustrated in FIG. 1 are the negative and positive electrolyte pumps 30 and 32, both used to pump electrolyte solution through the flow battery system 10. Electrolytes are stored in one or more tanks external to the cell, and are pumped via the negative and positive electrolyte pumps 30 and 32 through the negative electrode compartment 20 side and the positive electrode compartment 22 side of the battery, respectively.

The redox flow battery system 10 may also include a first bipolar plate 36 and a second bipolar plate 38, each positioned along a rear-facing side, e.g., opposite of a side facing the separator 24, of the negative electrode 26 and the positive electrode 28, respectively. The first bipolar plate 36 may be in contact with the negative electrode 26 and the second bipolar plate 38 may be in contact with the positive electrode 28. In other examples, however, the bipolar plates may be arranged proximate but spaced away from the electrodes within the respective electrode compartments. In either case, the bipolar plates 36 and 38 may be electrically coupled to the terminals 40 and 42, respectively, either via direct contact therewith or through the negative and positive electrodes 26 and 28, respectively. The IFB electrolytes may be transported to reaction sites at the negative and positive electrodes 26 and 28 by the first and second bipolar plates 36 and 38, resulting from conductive properties of a material of the bipolar plates 36, 38. Electrolyte flow may also be assisted by the negative and positive electrolyte pumps 30 and 32, facilitating forced convection through the first redox flow battery cell 18. Reacted electrochemical species may also be directed away from the reaction sites by the combination of forced convection and the presence of the first and second bipolar plates 36 and 38.

As illustrated in FIG. 1, the first redox flow battery cell 18 may further include negative battery terminal 40, and positive battery terminal 42. When a charge current is applied to the battery terminals 40 and 42, the positive electrolyte is oxidized (lose one or more electrons) at the positive electrode 28, and the negative electrolyte is reduced (gain one or more electrons) at the negative electrode 26. During battery discharge, reverse redox reactions occur on the electrodes. In other words, the positive electrolyte is reduced (gain one or more electrons) at the positive electrode 28, and the negative electrolyte is oxidized (lose one or more electrons) at the negative electrode 26. The electrical potential difference across the battery is maintained by the electrochemical redox reactions in the positive electrode compartment 22 and the negative electrode compartment 20, and may induce a current through a current collector while the reactions are sustained. The amount of energy stored by a redox battery is limited by the amount of electroactive material available in electrolytes for discharge, depending on the total volume of electrolytes and the solubility of the electroactive materials.

The flow battery system 10 may further include the integrated multi-chambered electrolyte storage tank 110. The multi-chambered storage tank 110 may be divided by a bulkhead 98. The bulkhead 98 may create multiple chambers within the storage tank so that both the positive and negative electrolyte may be included within a single tank. The negative electrolyte chamber 50 holds negative electrolyte including electroactive materials, and the positive electrolyte chamber 52 holds positive electrolyte including electroactive materials. The bulkhead 98 may be positioned within the multi-chambered storage tank 110 to yield a desired volume ratio between the negative electrolyte chamber 50 and the positive electrolyte chamber 52. In one example, the bulkhead 98 may be positioned to set the volume ratio of the negative and positive electrolyte chambers according to the stoichiometric ratio between the negative and positive redox reactions. FIG. 1 further illustrates the fill height 112 of storage tank 110, which may indicate the liquid level in each tank compartment. FIG. 1 also shows gas head space 90 located above the fill height 112 of negative electrolyte chamber 50, and gas head space 92 located above the fill height 112 of positive electrolyte chamber 52. The gas head space 92 may be utilized to store hydrogen gas generated through operation of the redox flow battery (e.g., due to proton reduction and corrosion side reactions) and conveyed to the multi-chambered storage tank 110 with returning electrolyte from the first redox flow battery cell 18. The hydrogen gas may be separated spontaneously at the gas-liquid interface (e.g., fill height 112) within the multi-chambered storage tank 110, thereby precluding having additional gas-liquid separators as part of the redox flow battery system. Once separated from the electrolyte, the hydrogen gas may fill the gas head spaces 90 and 92. As such, the stored hydrogen gas can aid in purging other gases from the multi-chamber storage tank 110, thereby acting as an inert gas blanket for reducing oxidation of electrolyte species, which can help to reduce redox flow battery capacity losses. In this way, utilizing the integrated multi-chambered storage tank 110 may forego having separate negative and positive electrolyte storage tanks, hydrogen storage tanks, and gas-liquid separators common to conventional redox flow battery systems, thereby simplifying the system design, reducing the physical footprint of the system, and reducing system costs.

FIG. 1 also shows the spill over-hole 96, which creates an opening in the bulkhead 98 between gas head spaces 90 and 92, and provides a means of equalizing gas pressure between the two chambers. The spill over hole 96 may be positioned a threshold height above the fill height 112. The spill over hole further enables a capability to self-balance the electrolytes in each of the positive and negative electrolyte chambers in the event of a battery crossover. In the case of an all iron redox flow battery system, the same electrolyte ($Fe^2$) is used in both negative and positive electrode compartments 20 and 22, so spilling over of electrolyte between the negative and positive electrolyte chambers 50, 52 may reduce overall system efficiency, but the overall electrolyte composition, battery module performance, and battery module capacity are maintained. Flange fittings may be utilized for all piping connections for inlets and outlets to and from the multi-chambered storage tank 110 to maintain a continuously pressurized state without leaks. The multi-chambered storage tank 110 can include at least one outlet from each of the negative and positive electrolyte chambers, and at least one inlet to each of the negative and positive electrolyte chambers. Furthermore, one or more outlet connections may be provided from the gas head spaces 90 and 92 for directing hydrogen gas to rebalancing reactors 80 and 82.

Although not shown in FIG. 1, integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers may include one or more heaters. In the case where only the positive electrolyte chamber 52 includes one or more heaters, the negative electrolyte may be heated by transferring heat generated at the battery cells of the power module to the negative electrolyte. In this way, the battery cells of the power module may heat and facilitate temperature regulation of the negative electrolyte. The one or more heaters may be actuated by the controller 88 to regulate a temperature of the negative electrolyte chamber 50 and the positive electrolyte chamber 52 independently or together. For example, in response to an electrolyte temperature decreasing below a threshold temperature, the controller 88 may increase a power supplied to one or more heaters so that a heat flux to the electrolyte is increased. The electrolyte temperature may be indicated by one or more temperature sensors mounted at the multi-chambered electrolyte storage tank 110, including sensors 60 and 62. The one or more heaters may include coil type heaters or other immersion heaters immersed in the electrolyte fluid, or surface mantle type heaters that transfer heat conductively through the walls of the negative and positive electrolyte chambers to heat the fluid therein. Other known types of tank heaters may be employed without departing from the scope of the present disclosure. Furthermore, controller 88 may deactivate one or more heaters in the negative and positive electrolyte chambers 50, 52 in response to a liquid level decreasing below a solid fill threshold level. Said another way, controller 88 may activate the one or more heaters in the negative and positive electrolyte chambers 50, 52 only in response to a liquid level increasing above the solids fill threshold level. In this way, activating the one or more heaters without sufficient liquid in the positive and/or negative electrolyte chambers can be averted, thereby reducing a risk of overheating or burning out the heaters.

Further still, one or more inlet connections may be provided to each of the negative and positive electrolyte chambers 50, 52 from a field hydration system (not shown). In this way, the field hydration system can facilitate commissioning of the redox flow battery system, including installing, filling, and hydrating the system, at an end-use location. Furthermore, prior to its commissioning at the end-use location, the redox flow battery system may be dry-assembled at a battery manufacturing facility different from end-use location without filling and hydrating the system, before delivering the system to the end-use location. In one example, the end-use location may correspond to the location where the redox flow battery system 10 is to be installed and utilized for on-site energy storage. In other words, it is anticipated that, once installed and hydrated at the end-use location, a position of the redox flow battery system 10 becomes fixed, and the redox flow battery system 10 is no longer deemed a portable, dry system. Thus, from the perspective of a redox flow battery system end-user, the dry portable redox flow battery system 10 may be delivered on-site, after which the redox flow battery system 10 is installed, hydrated and commissioned. Prior to hydration, the redox flow battery system 10 may be referred to as a dry, portable system, the redox flow battery system 10 being free of or without water and wet electrolyte. Once hydrated, the redox flow battery system 10 may be referred to as a wet non-portable system, the redox flow battery system 10 including wet electrolyte.

Further illustrated in FIG. 1, electrolyte solutions typically stored in the multi-chambered storage tank 110 are pumped via negative and positive electrolyte pumps 30 and 32 throughout the flow battery system 10. Electrolyte stored in negative electrolyte chamber 50 is pumped via negative electrolyte pump 30 through the negative electrode compartment 20 side, and electrolyte stored in positive electrolyte chamber 52 is pumped via positive electrolyte pump 32 through the positive electrode compartment 22 side of the battery.

Two electrolyte rebalancing reactors 80 and 82, may be connected in-line or in parallel with the recirculating flow paths of the electrolyte at the negative and positive sides of the first battery cell 18, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in the return flow path from the positive and negative electrode compartments 20 and 22 to the positive and negative electrolyte chambers 50 and 52, respectively. Electrolyte rebalancing reactors 80 and 82 may serve to rebalance electrolyte charge imbalances in the redox flow battery system occurring due to side reactions, ion crossover, and the like, as described herein. In one example, electrolyte rebalancing reactors 80 and 82 may include trickle bed reactors, where the hydrogen gas and electrolyte are contacted at catalyst surfaces in a packed bed for carrying out the electrolyte rebalancing reaction. In other examples, the rebalancing reactors 80 and 82 may include flow-through type reactors that are capable of contacting the hydrogen gas and the electrolyte liquid and carrying out the rebalancing reactions in the absence a packed catalyst bed.

During operation of the redox flow battery system 10, sensors and probes may monitor and control chemical properties of the electrolyte such as electrolyte pH, concentration, state of charge, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. In another example, sensors 62 and 60 may each include one or more electrolyte level sensors to indicate a level of electrolyte in the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. The sensors 72, 70 may be pH probes, optical probes, pressure sensors, voltage sensors, etc. Sensors may be positioned at other locations throughout the redox flow battery system 10 to monitor electrolyte chemical properties and other properties.

For example, a sensor may be positioned in an external acid tank (not shown) to monitor acid volume or pH of the external acid tank, wherein acid from the external acid tank is supplied via an external pump (not shown) to the redox flow battery system 10 in order to reduce precipitate formation in the electrolytes. Additional external tanks and sensors may be installed for supplying other additives to the redox flow battery system 10. For example, various sensors including, temperature, conductivity, and level sensors of a field hydration system may transmit signals to the controller 88. Furthermore, controller 88 may send signals to actuators such as valves and pumps of the field hydration system during hydration of the redox flow battery system 10. Sensor information may be transmitted to a controller 88 which may in turn actuate pumps 30 and 32 to control electrolyte flow through the first battery cell 18, or to perform other control functions, as an example. In this manner, the controller 88 may be responsive to, one or a combination of sensors and probes.

Redox flow battery system 10 may further include a source of hydrogen gas. In one example, the source of hydrogen gas may include a separate dedicated hydrogen gas storage tank. In the example of FIG. 1, hydrogen gas may be stored in and supplied from the integrated multi-chambered electrolyte storage tank 110. Integrated multi-chambered electrolyte storage tank 110 may supply additional hydrogen gas to the positive electrolyte chamber 52 and the negative electrolyte chamber 50. Integrated multi-chambered electrolyte storage tank 110 may alternately supply additional hydrogen gas to the inlet of electrolyte rebalancing reactors 80 and 82. As an example, a mass flow meter or other flow-controlling device (which may be controlled by controller 88) may regulate the flow of the hydrogen gas from integrated multi-chambered electrolyte storage tank 110. The integrated multi-chambered electrolyte storage tank 110 may supplement the hydrogen gas generated in redox flow battery system 10. For example, when gas leaks are detected in redox flow battery system 10 or when the reduction reaction rate is too low at low hydrogen partial pressure, hydrogen gas may be supplied from the integrated multi-chambered electrolyte storage tank 110 in order to rebalance the state of charge of the electroactive species in the positive electrolyte and negative electrolyte. As an example, controller 88 may supply hydrogen gas from integrated multi-chambered electrolyte storage tank 110 in response to a measured change in pH or in response to a measured change in state of charge of an electrolyte or an electroactive species.

For example, an increase in pH of the negative electrolyte chamber 50, or the negative electrode compartment 20, may indicate that hydrogen is leaking from the redox flow battery system 10 and/or that the reaction rate is too slow with the available hydrogen partial pressure, and controller 88, in response to the pH increase, may increase a supply of hydrogen gas from integrated multi-chambered electrolyte storage tank 110 to the redox flow battery system 10. As a further example, controller 88 may supply hydrogen gas from integrated multi-chambered electrolyte storage tank 110 in response to a pH change, wherein the pH increases beyond a first threshold pH or decreases beyond a second threshold pH. In the case of an IFB, controller 88 may supply additional hydrogen to increase the rate of reduction of ferric ions and the rate of production of protons, thereby reducing the pH of the positive electrolyte. Furthermore, the negative electrolyte pH may be lowered by hydrogen reduction of ferric ions crossing over from the positive electrolyte to the negative electrolyte or by protons, generated at the positive side, crossing over to the negative electrolyte due to a proton concentration gradient and electrophoretic forces. In this manner, the pH of the negative electrolyte may be maintained within a stable region, while reducing the risk of precipitation of ferric ions (crossing over from the positive electrode compartment) as $Fe(OH)_3$.

Other control schemes for controlling the supply rate of hydrogen gas from integrated multi-chambered electrolyte storage tank 110 responsive to a change in an electrolyte pH or to a change in an electrolyte state of charge, detected by other sensors such as an oxygen-reduction potential (ORP) meter or an optical sensor, may be implemented. Further still, the change in pH or state of charge triggering the action of controller 88 may be based on a rate of change or a change measured over a time period. The time period for the rate of change may be predetermined or adjusted based on the time constants for the redox flow battery system 10. For example, the time period may be reduced if the recirculation rate is high, and local changes in concentration (e.g., due to side reactions or gas leaks) may quickly be measured since the time constants may be small.

Figure 2:
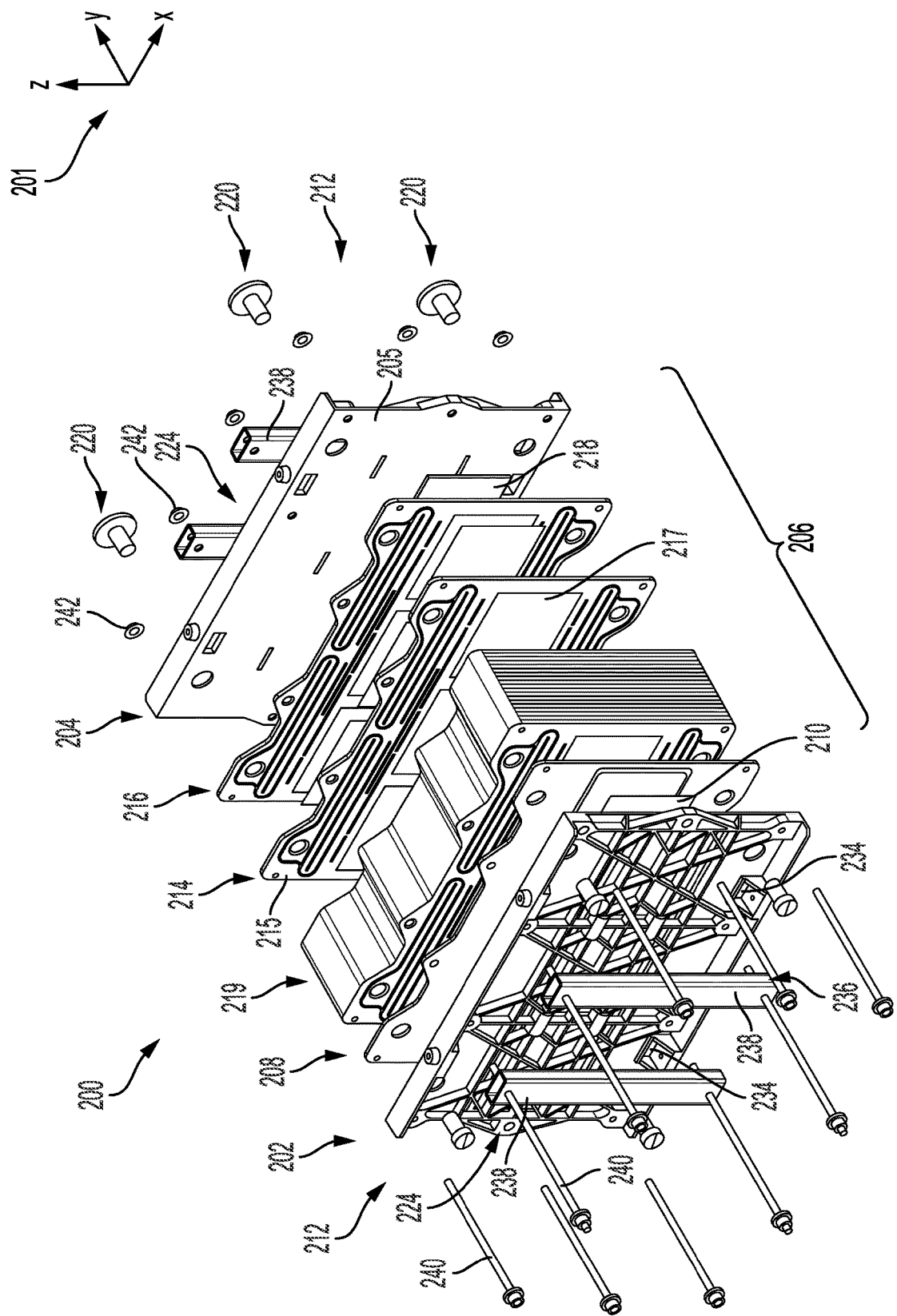
FIG. 2 shows an exploded view of an example of a redox flow battery with a compression assembly.

FIG. 2 shows an example of a redox flow battery 200 (e.g., IFB) having a first pressure plate 202 and a second pressure plate 204 with a cell stack 206 positioned therebetween. Specifically, interior sides 205 of the pressure plates may be designed to interface with opposing sides of the cell stack 206. It will be understood that the redox flow battery 200, shown in FIG. 2, as well as the other redox flow batteries and systems described herein are examples of the redox flow battery system 10, illustrated in FIG. 1. Thus, structural and/or functional features of the redox flow battery system 10, shown in FIG. 1, may be exhibited in the other redox flow batteries and battery systems described herein or vice-versa.

An axis system 201 is provided in FIGS. 2-23 for reference. The z-axis may be parallel to a gravitational axis. The y-axis may be a longitudinal axis and/or the x-axis may be a lateral axis. However, other orientations of the axes may be used, in other embodiments.

The cell stack 206 includes a first endplate 208 positioned inside of the first pressure plate 202 and in face-sharing contact with an interior surface of the first pressure plate 202. A first current collector 210, configured to flow electrical current, may be arranged between the first endplate 208 and the first pressure plate 202. The first and second pressure plates 202, 204 are positioned on opposing terminal ends 212 of the redox flow battery 200.

In the cell stack 206, a first bipolar plate assembly 214 is arranged between the first endplate 208 and a second endplate 216 of the first cell stack 206. Additionally, bipolar plate assemblies 219 are shown stacked along the y-axis. The bipolar plate assemblies include a plurality of frame plates 215 also stacked along the y-axis. The plurality of frame plates 215 provide structural support to the cell stack 206. The frame plates 215 also includes a plurality of electrolyte flow channels routed therethrough, described in greater detail herein with regard to FIGS. 4-20. Each frame plate of the plurality of frame plates 215 may be similarly configured to frame a cell of the cell stack. Each cell includes one or more bipolar plates 217 inserted into at least one opening of each frame plate. Furthermore, the bipolar plate is positioned between a negative electrode and a positive electrode of each cell, the electrodes arranged along opposite faces of the bipolar plate. In addition, the negative electrode is positioned between the bipolar plate and a membrane separator (e.g., the separator 24 of FIG. 1). In this way, each bipolar plate assembly has a stack of components including the membrane separator, the negative electrode, the bipolar plate, and the positive electrode, and the stack of components is repeated with each successive bipolar plate assembly in the cell stack 206. However, it will be understood that other suitable cell stack arrangements may be deployed, in other embodiments.

The second endplate 216 may be in face-sharing contact with the second pressure plate 204. A second current collector 218 may be arranged between the second endplate 216 and the second pressure plate 204.

FIG. 2 also shows a plurality of flow ports 220. The flow ports 220 are designed to flow electrolyte (e.g., positive or negative electrolyte) into and out of the cell stack 206. As such, the flow ports 220 are shown extending through openings in the second pressure plate 204.

The first and second pressure plates 202, 204 may be designed to both structurally reinforce the redox flow battery 200 and apply a preload force to the cell stack, when assembled. In this way, the pressure plates serve a dual-use and allow the compactness of the battery system to be increased, if desired. However, numerous battery plate and housing arrangements have been contemplated.

The pressure plates 202, 204 may also include a plurality of forklift openings 234 allowing a forklift to engage the pressure plates during battery construction, installation, servicing, etc. Consequently, the battery units may be efficiently manipulated via forklifts, if desired.

The redox flow battery 200 also include a compression assembly 236 designed to exert preload forces on the cell stack 206 to reduce deflection of the cell stack (e.g., active area of the cell stack) during battery operation. The compression assembly 236 includes springs 238 (e.g., leaf springs) extending along outer sides 224 of the pressure plates 202, 204.

The redox flow battery 200 further includes a plurality of tie rods 240. The tie rods 240 are designed to extend through the springs 238, pressure plates 202, 204, and cell stack 206. Other tie rods may extend through the pressure plates 202, 204 as well as the cell stack 206 and may not pass through the spring 238. Nuts 242 designed to threadingly engage the tie rods 240 to allow a compression force to be exerted on the cell stack 206, are included in the redox flow battery 200.

Figure 3:
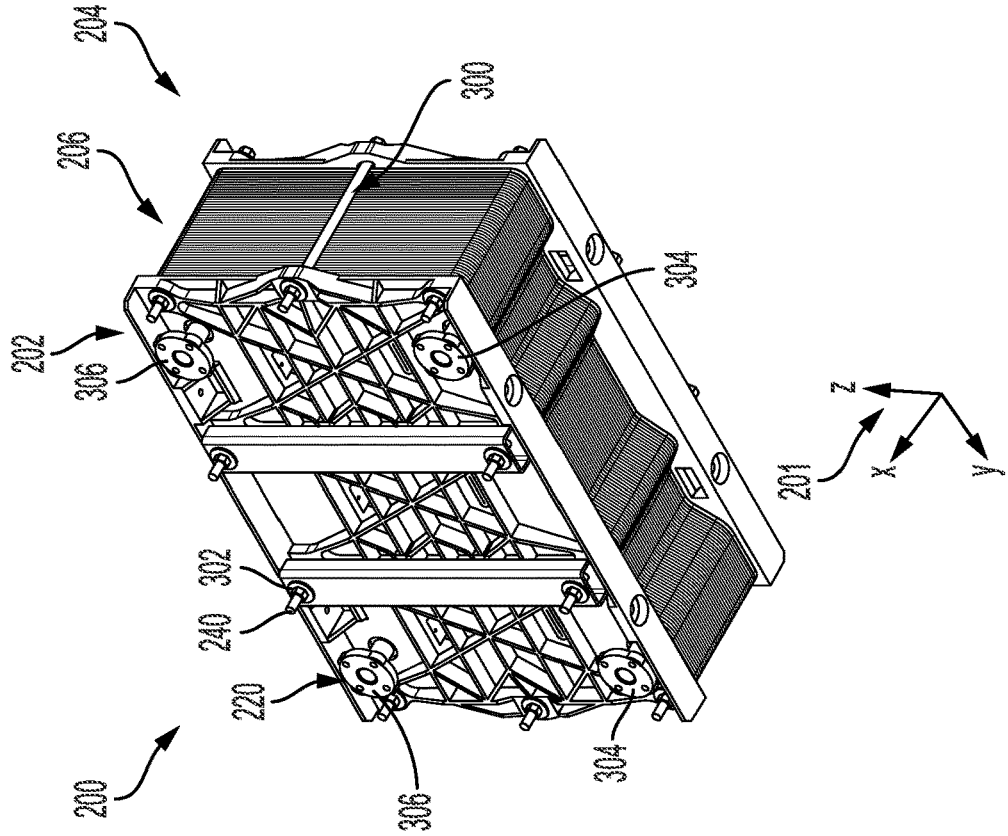
FIG. 3 shows an assembled view of the redox flow battery, depicted in FIG. 2.

FIG. 3 illustrates the redox flow battery 200 in an assembled configuration. A portion of the tie rods 240 are shown extending through the springs 238. To elaborate, the tie rods 240 extend through upper and lower sections of the springs 238 to facilitate spring flexion. Additional tie rods 240 are shown extending through the pressure plates 202, 204 and the cell stack 206. Side bolts 300, are also shown extending through the pressure plates 202, 204. Heads 302 of the tie rods 240 and the nuts 242 (see FIG. 2) coupled to the tie rods may be tightened to allow cell stack compression to be set during battery assembly.

FIG. 3 again illustrates the flow ports 220 designed to enable electrolyte flow into and out of the cell stack 206. Specifically, in one embodiment, the ports 304 may be inflow ports and the ports 306 may be outflow ports. However, other battery inflow and outflow schemes have been contemplated. To elaborate, a positive electrolyte inflow port and a negative electrolyte inflow port may be provided in the redox flow battery 200. Likewise, a positive electrolyte outflow port and a negative electrolyte outflow port may be provided in the redox flow battery 200.

Figure 4:
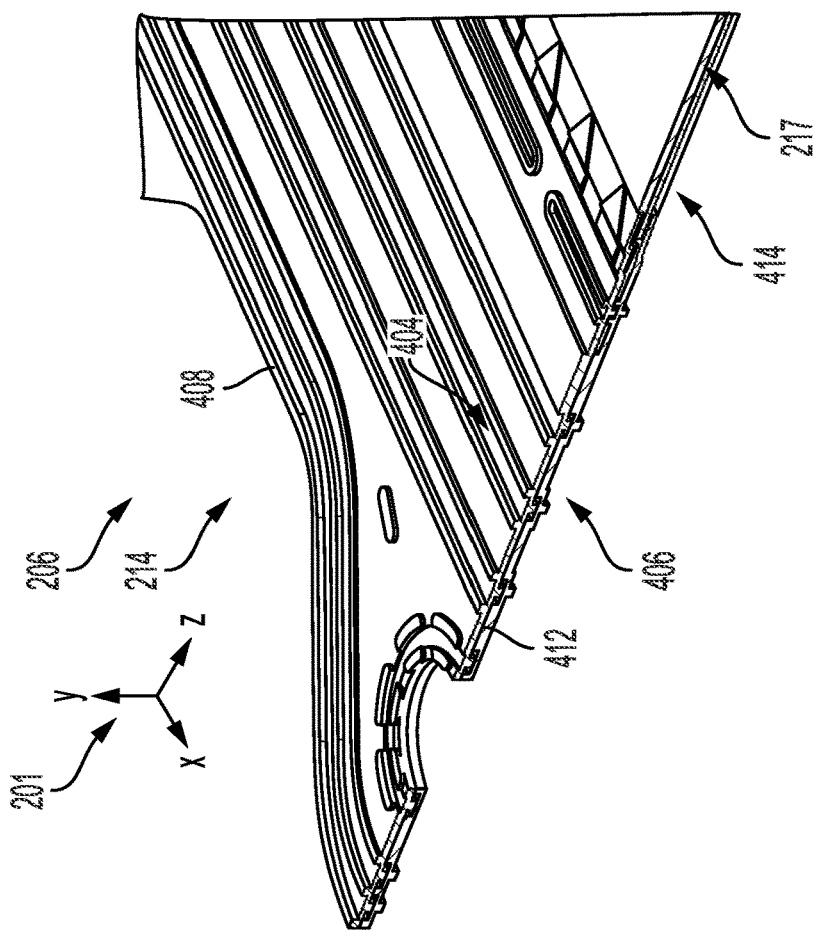
FIG. 4 shows a cross-sectional view of an example of a cell stack with a bipolar plate assembly.

FIG. 4 shows a portion of the cell stack 206 including the bipolar plate assembly 214. The bipolar plate assembly 214 includes a bipolar frame assembly 404 and a membrane frame assembly 406 mated with one another to form electrolyte flow paths.

The bipolar frame assembly 404 includes a bipolar frame plate 408 and bipolar plates 217 supported by the bipolar frame plate. The membrane frame assembly 406 includes a membrane frame plate 412 and a membrane 414 supported by the membrane frame plate. The mated design of the bipolar plate assembly 214 enables the assembly's compactness to be increased when compared to plate and cap style designs, allowing the amount of material for constructing the assembly to be reduced to drive down manufacturing costs. Furthermore, structurally unsupported membranes may be forgone, if desired, resulting in decreased cell stack deformation.

Figure 5:
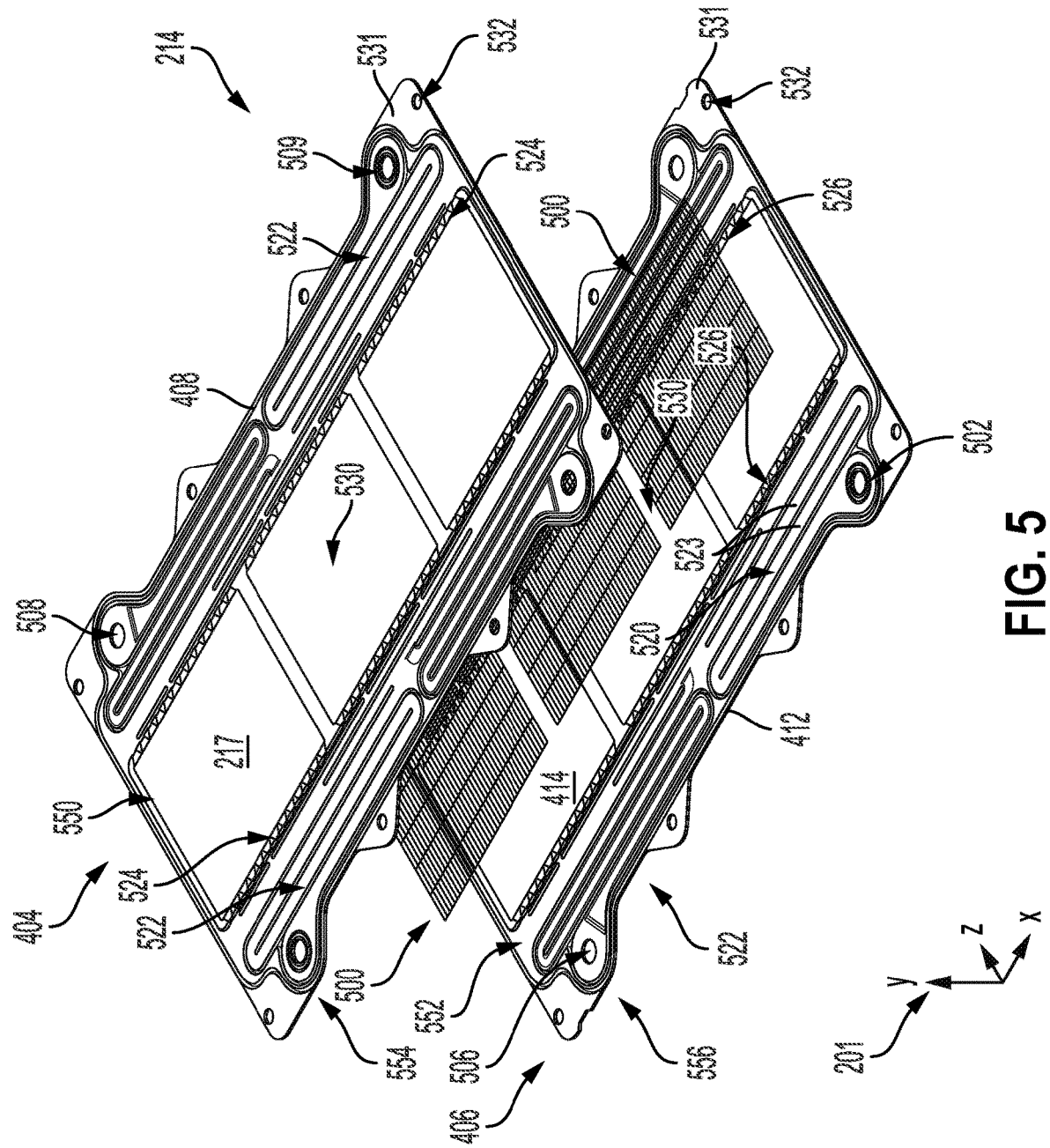
FIG. 5 shows an exploded view of the bipolar plate assembly, illustrated in FIG. 4.

FIG. 5 shows a partially exploded view of the bipolar plate assembly 214 again including the bipolar frame assembly 404 and the membrane frame assembly 406. A reinforcing mesh 500 is positioned between the bipolar frame assembly 404 and the membrane frame assembly 406 for structural support to the bipolar plates 217 and membrane 414. In this way, flexion and other unwanted stack deformation may be reduced.

Figure 21:
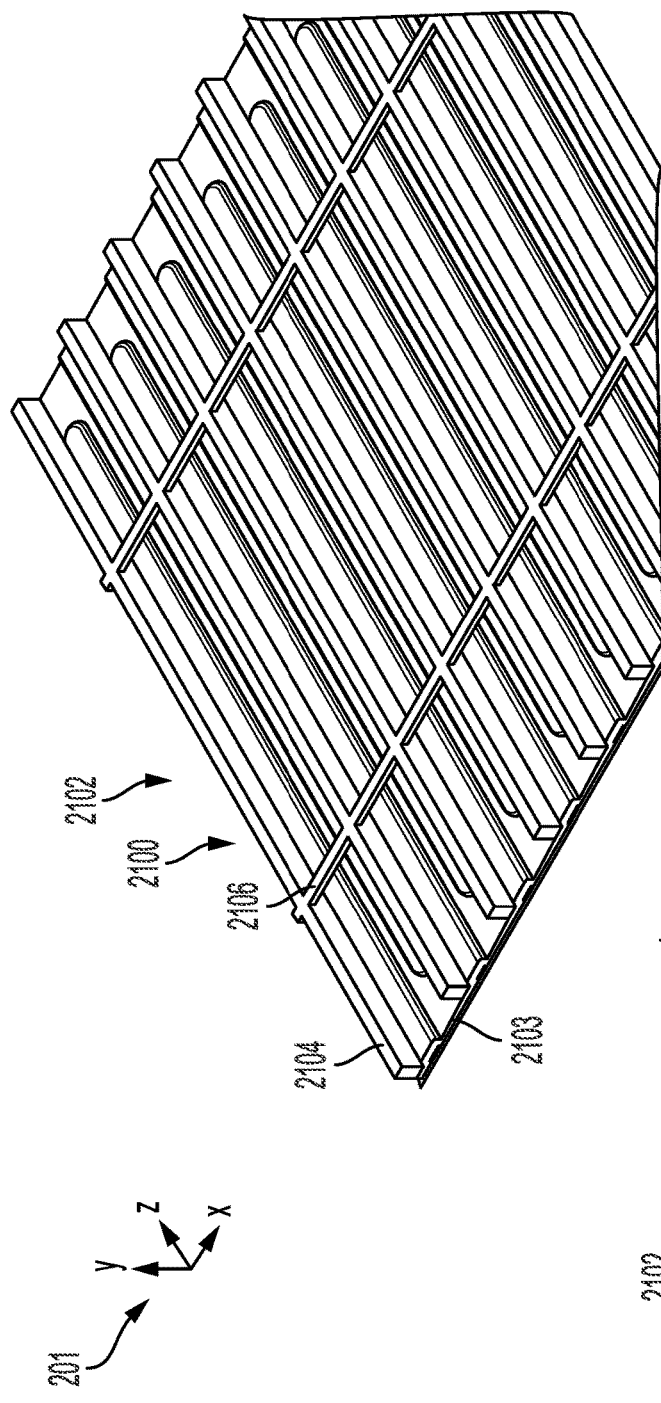
FIG. 21-22 illustrate an example of a reinforcing membrane in a cell stack.

Turning to FIG. 21 showing a detailed view of an example of a reinforcing mesh 2100 in a bipolar plate assembly 2102 having a bipolar plate 2103. Thus, the reinforcing mesh 2100 is an example of the mesh 500 shown in FIG. 5. The mesh 2100 includes ribs 2104 and cross-bracing 2106 extending between and structurally reinforcing the ribs. The ribs 2104 and cross-bracing 2106 have a polygonal shape (e.g., a rectangular shape) in cross-section. However, alternate rib and/or cross-bracing contours have been envisioned.

Figure 22:
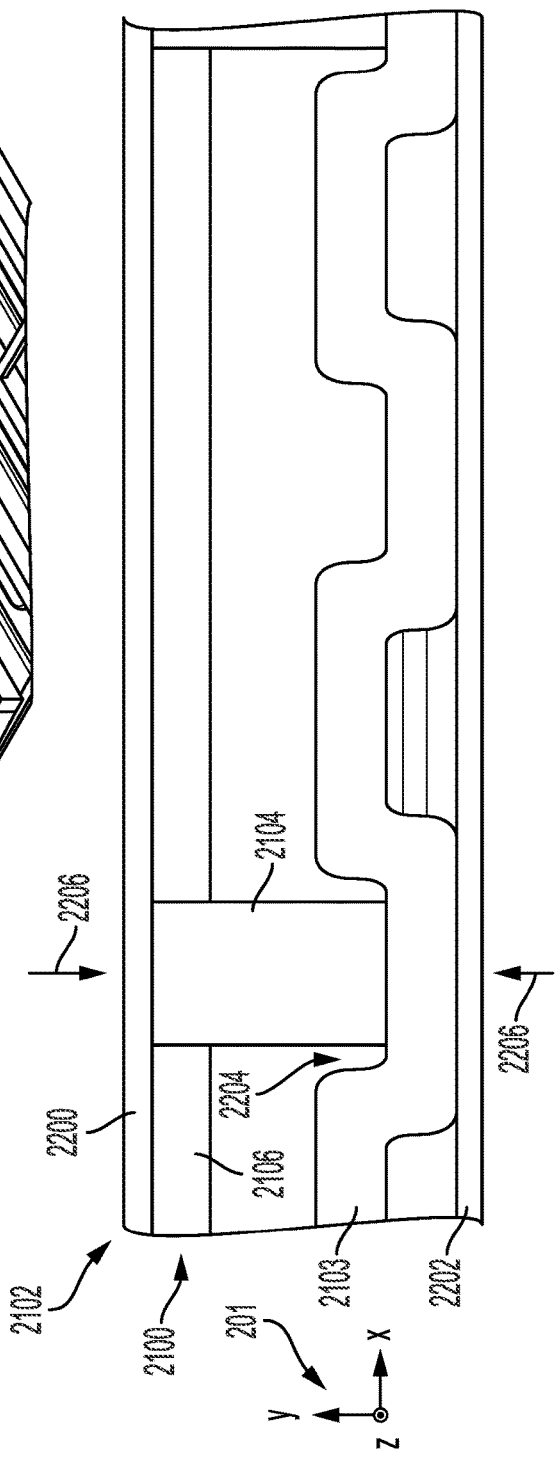

FIG. 22 shows a cross-sectional view of the bipolar plate assembly 2102 with a membrane 2200 adjacent to the reinforcing mesh 2100 and a felt layer 2202 adjacent to the bipolar plate 2103. The reinforcing ribs 2104 are mated with detents 2204 in the bipolar plate 2103. It will be appreciated that the bipolar plate 2103 may include a carbon sheet and/or graphite foil that is stamped to form the detents 2204. The reinforcing ribs 2104 allow for more even and effective compressive force distribution during battery use, resulting in reduced stack deformation. Arrows 2206 indicate the general direction of the compressive forces applied to the cell stack. As previously discussed, the cell stack compression is generated by the compression assembly 236, shown in FIG. 2. In one example, the reinforcing mesh 2100 may be constructed out of a suitable polymer (e.g., polypropylene), allowing for structural reinforcement of the cell stack without electromagnetically interfering with the electrolyte.

Referring again to FIG. 5, the bipolar plate assembly 214 includes a negative electrolyte inlet 502 and a positive electrolyte inlet 506 at least partially within the membrane frame plate 412. It will be understood that the electrolyte inlets and outlets are formed via the mating between the bipolar frame assembly 404 and the membrane frame assembly 406, discussed in greater detail herein with regard to FIGS. 17-20. The bipolar plate assembly 214 also includes a negative electrolyte outlet 508 and a positive electrolyte outlet 509 at least partially within the bipolar frame plate 408.

Electrolyte flow channels are also formed at the interface of the bipolar frame assembly 404 and the membrane frame assembly 406. To elaborate, in the bipolar plate assembly 214, when assembled, negative shunt channels 520 extend from their respective electrolyte inlets and outlets (negative electrolyte inlet 502 and outlet 900, shown in FIG. 9, in the membrane frame assembly 406). Positive shunt channels 522 also extend from their respective inlets and outlets (positive electrolyte inlet 506 and positive electrolyte outlet 509 in the bipolar frame plate 408). However, other suitable electrolyte flow paths in the shunt channels have been envisioned.

The shunt channels may be designed with a serpentine shape with sections 523 exhibiting substantially opposing electrolyte flow directionality, allowing the length of the channels to be increased. Reductions in shunt current result from the lengthening of the shunt channels. Consequently, the battery system may be operated more efficiently with regard to energy power output and in some cases storage capacity. It will be appreciated that the cross-sectional area of the shunt channels may also be decreased to reduce shunt current, in certain examples.

The bipolar plate assembly 214, when assembled, includes negative inlet and outlet distribution channels 526. The distribution channels enable electrolyte to be distributed and captured from the active plate area 530. Thus, the distribution channels are in fluidic communication with associated shunt channels.

It will be appreciated that the general flow path the electrolyte (e.g., positive or negative electrolyte) in the bipolar plate assembly 214 proceeds as follows: (i) electrolyte initially flows through an electrolyte inlet into a corresponding shunt channel; (ii) electrolyte then flows from the shunt channel into the inlet distribution channels; (iii) electrolyte then flows from the inlet distribution channels into the membrane/bipolar plate interface; (iv) electrolyte then flows from the membrane/bipolar plate interface into the outlet distribution channels; (v) electrolyte then flows from the outlet distribution channels to associated shunt channels; and (vi) subsequently the electrolyte flows from the shunt channels into a respective electrolyte outlet.

The membrane frame plate 412 and/or the bipolar frame plate 408 may be constructed out of a suitable polymer such as chlorinated polyvinyl chloride (CPVC) and the like. The membrane may be constructed out of a coated Nafion™, in one use-case example. However, other suitable membrane materials are envisioned. When assembled, the membrane frame assembly 406 and the bipolar frame assembly 404 may be adhesively bonded together. Adhesive bonding may also be used to adhere the membrane 414 to the membrane frame plate 412 and/or the bipolar plates 217 to the bipolar frame plate 408. However, other suitable attachment techniques such as heat welding have also been contemplated for attaching these components.

Figure 9:
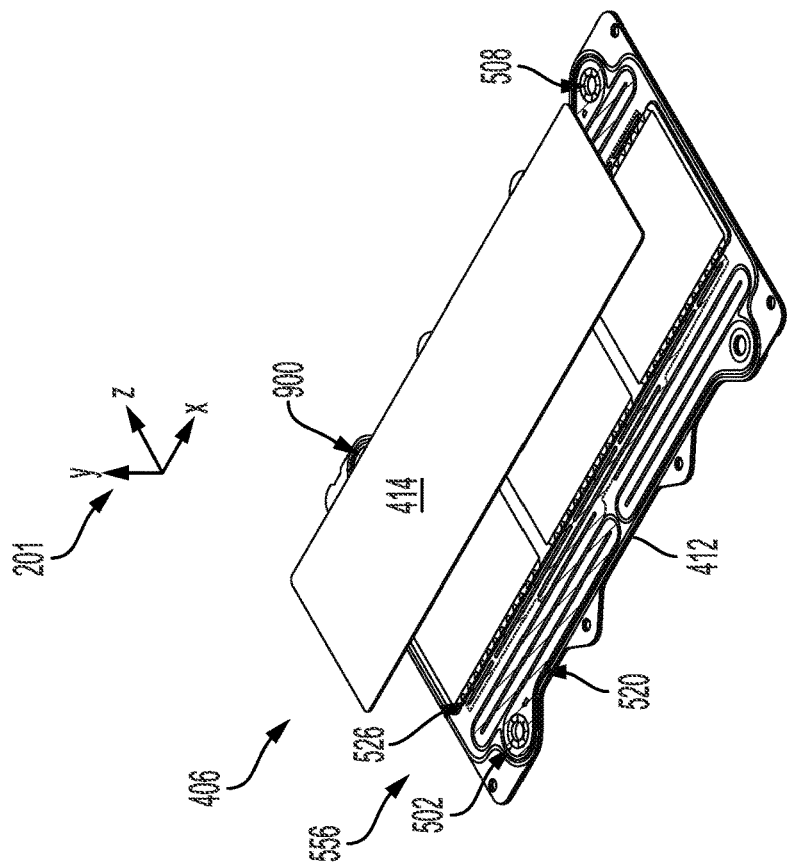
FIG. 9 shows an exploded view of the membrane frame assembly included in the bipolar plate assembly, illustrated in FIG. 4.
Figure 8:
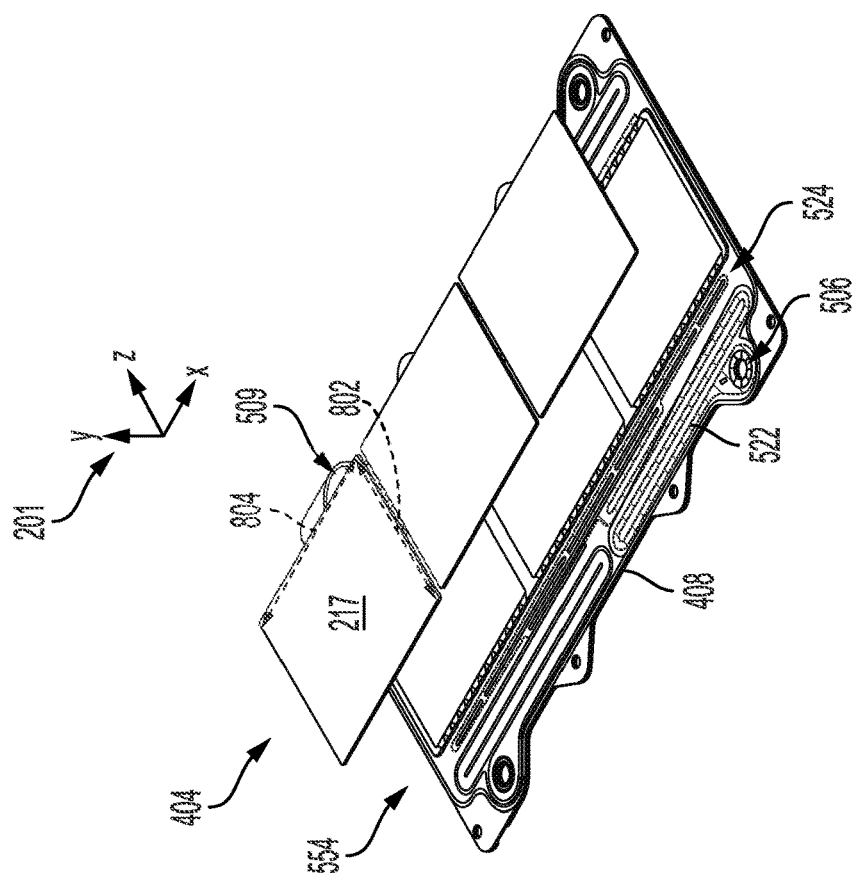
FIG. 8 shows an exploded view of the bipolar frame assembly included in the bipolar plate assembly, illustrated in FIG. 4.

FIG. 5 also shows tabs 531 with bolt opening 532 structurally reinforcing the bolts, enabling greater force dispersion in the cell stack. The tabs 531 are in both the membrane frame plate 412 and the bipolar frame plate 408. However, other plate contours may be used, in other examples. A first side 550 of the bipolar frame plate 408 and a first side 552 of the membrane frame plate 412 are shown in FIG. 5. The second sides 554 and 556 of the bipolar frame plate and the membrane frame plate, respectively, are also shown in FIG. 5. FIGS. 8-9 depict detailed views of the second sides of the bipolar and membrane frame plates and are discussed in greater detail herein.

Figure 6:
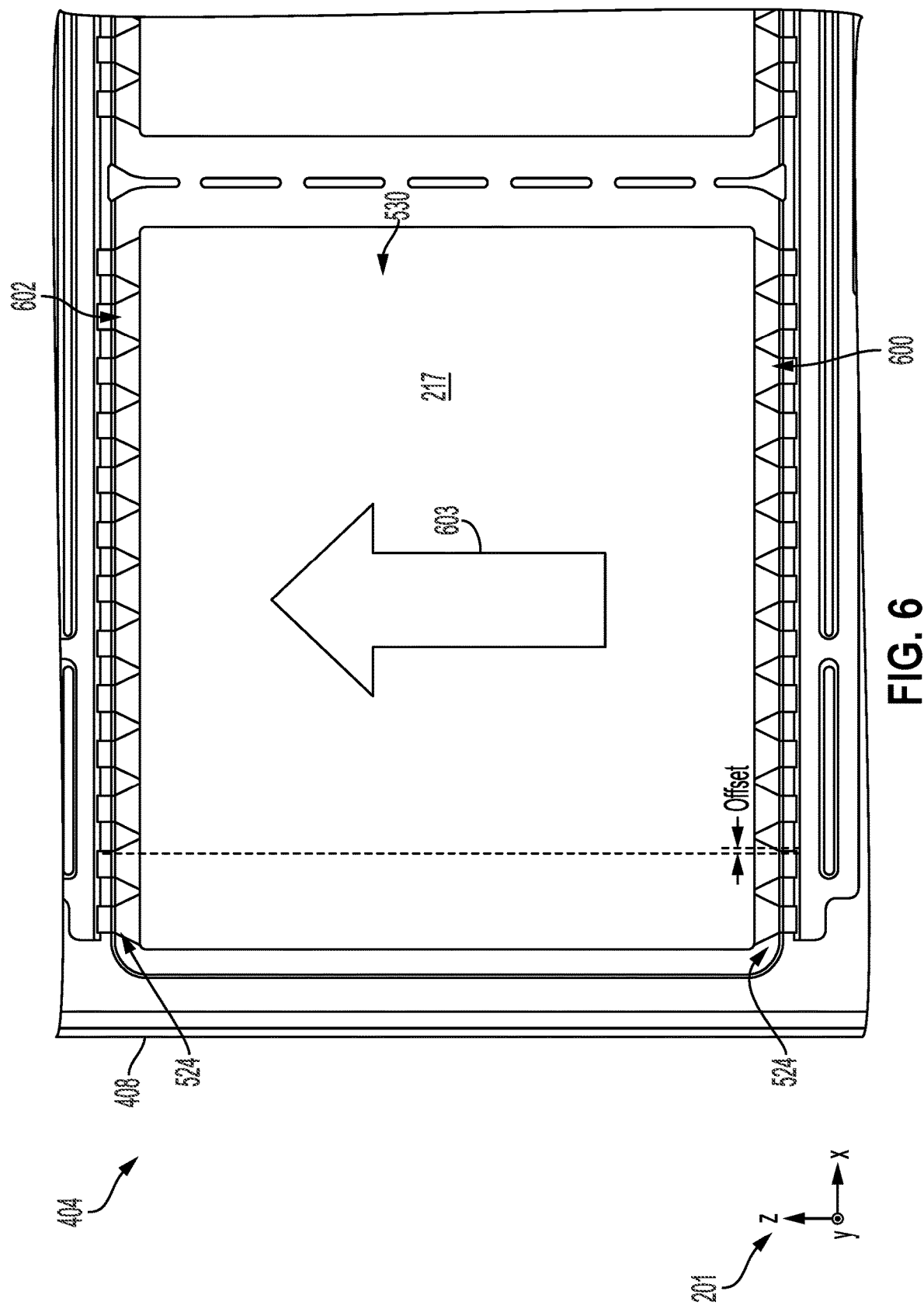
FIG. 6 shows a detailed view of distribution channels in the bipolar plate assembly, illustrated in FIG. 4.

FIG. 6 shows a detailed view of the bipolar frame assembly 404 including the bipolar plates 217 and the bipolar frame plate 408 with the distribution channels 524. Specifically, the inlet distribution channels are indicated at 600 and the outlet distribution channels are indicated at 602. A general direction of electrolyte flow is indicated via arrow 603. However, in practice the electrolyte flow pattern has greater complexity. The inlet and outlet distribution channels 600 and 602, respectively, are offset (e.g., offset along the x-axis) from one another, in the illustrated example. Consequently, dead zones in electrolyte flow can be decreased, resulting in battery operational efficiency gains. Offsetting the distribution channels may also provide for a more compact plate assembly arrangement, allowing for more efficient battery scalability.

In one example, the inlet distribution channels 600 may diverge in a direction (e.g., direction along the z-axis) extending toward the active plate area 530. Conversely, the outlet distribution channels 602 may converge in a direction (e.g., direction along the z-axis) extending away from the active plate area 530. In this way, electrolyte dispersion across the active area is increased.

Figure 7:
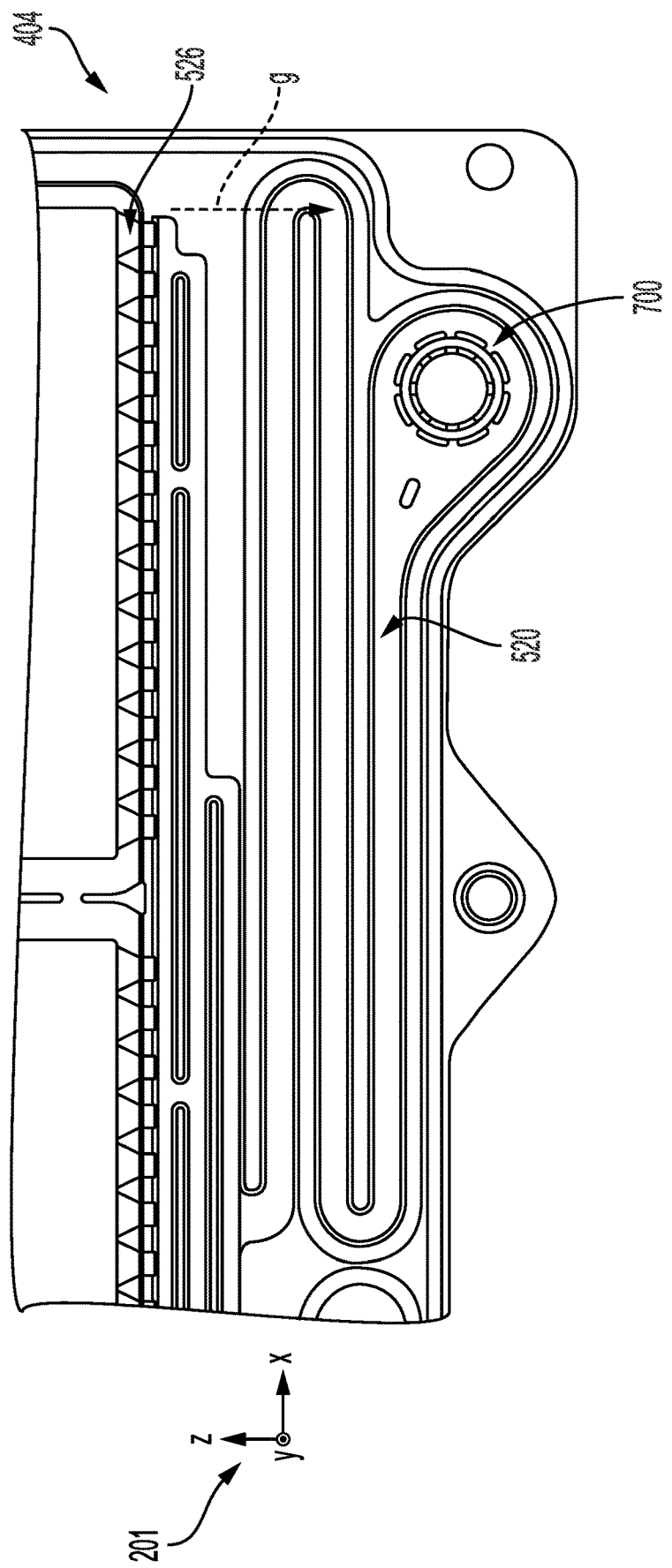
FIG. 7 shows a detailed view of a bipolar frame assembly included in the bipolar plate assembly, illustrated in FIG. 4.

FIG. 7 shows a detailed view of the bipolar frame assembly 404. To elaborate, the negative electrolyte inlet 700 is positioned vertically below the negative electrolyte shunt channels 520 as well as the positive electrolyte shunt channels 522, shown in FIG. 5. A gravitational axis is provided for reference. Positioning the electrolyte inlet below the shunts allows additional electrolyte to be drained from the cell stack, simplifying disassembly during repair or transport, for instance. Allowing the cell stack to drain the majority of the electrolyte, for example, also reduces the chance of (e.g., prevents) precipitate build up in the cell stack.

FIG. 8 shows an exploded view of the second side 554 of the bipolar frame assembly 404 including the bipolar frame plate 408 and the bipolar plates 217. The positive electrolyte inlet 506 and the positive electrolyte outlet 509 are shown flowing positive electrolyte to the positive shunt channels 522 and the distribution channels 524. The bipolar plates 217 are also shown in FIG. 8. The bipolar plates 217 may have an aspect ratio of greater than 1:3 (e.g., 1:1 in the illustrated embodiment) to decrease manufacturing costs. However, other suitable bipolar plate aspect ratios have been envisioned. An aspect ratio expresses a proportional relationship between the plate's height 802 and width 804. It will be understood that the bipolar plates may be partitioned to maintain a desired aspect ratio. For instance, in one use-case embodiment, three bipolar plates may be provided to maintain a 1:1 aspect ratio. However, alternate numbers of bipolar plates and/or different plate aspect ratios may be used, in other embodiments.

FIG. 9 illustrates an exploded perspective view of the second side 556 of the membrane frame assembly 406. The assembly includes the membrane frame plate 412 and the membrane 414. The negative electrolyte inlet 502 and the negative electrolyte outlet 508 are shown flowing negative electrolyte to the negative shunt channels 520 and the distribution channels 526.

The membrane 414 is also depicted in FIG. 9. The membrane 414 is shown as a continuous sheet in FIG. 9 extending laterally across the membrane frame plate 412. Thus, in one embodiment, the membrane 414 may span the plurality of bipolar plates in the adjacent bipolar frame assembly, when assembled. However, alternate membrane profiles have been envisioned. For instance, the membrane may be divided into distinct sections, in other embodiments.

Figure 10:
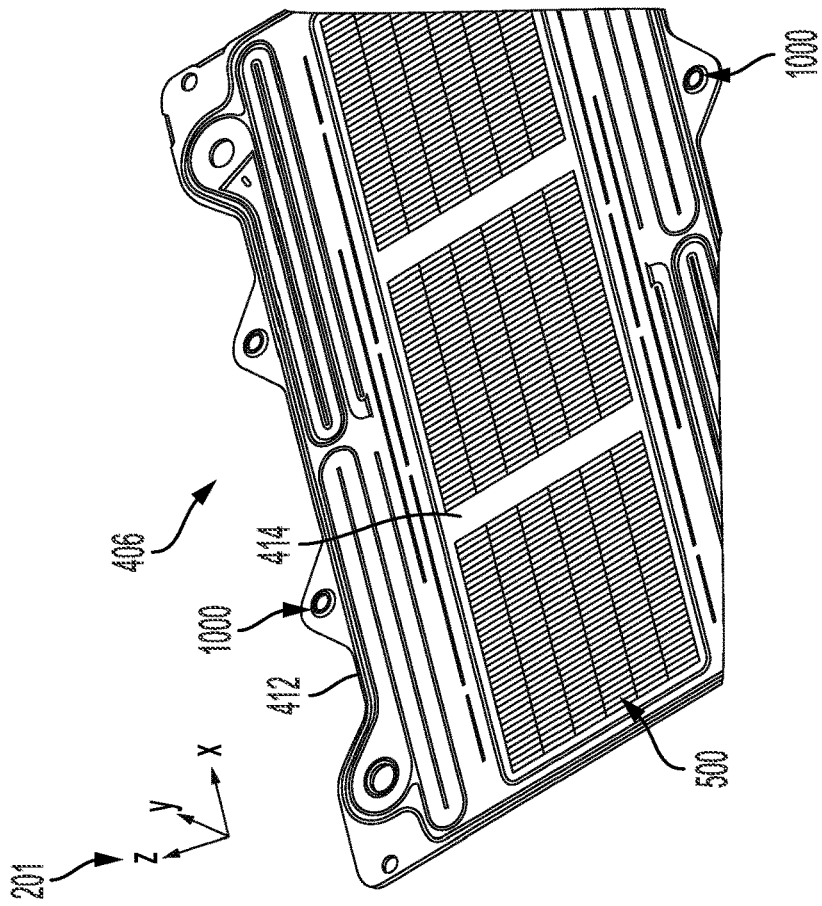
FIG. 10 shows a detailed view of the membrane frame assembly included in the bipolar plate assembly, illustrated in FIG. 4.

FIG. 10 shows a detailed view of the membrane frame assembly 406 in an assembled state with the reinforcing mesh 500 adjacent to the membrane 414. The membrane frame plate 412 includes a plurality of alignment bosses 1000 allowing for self-alignment with an adjacent bipolar frame plate including corresponding alignment bosses. In the illustrated embodiment, the frame plate includes four bosses. However, alternate numbers of frame plate bosses may be used, in other embodiments. In one example, the alignment bosses may be positioned on opposing vertical sides of the frame plates to facilitate rapid alignment during manufacture. In this way, cell stack manufacturing efficiency and accuracy may be increased. Specifically, the alignment bosses 1000 create a hole pattern datum facilitating quick part registration and inspection, thereby simplifying the automated manufacturing process. In one use-case example, a manufacturing mold may be modified to bring the bosses into alignment in a more cost effective manner than other types of alignment features, such as alignment features spanning the entire plate.

Figure 11:
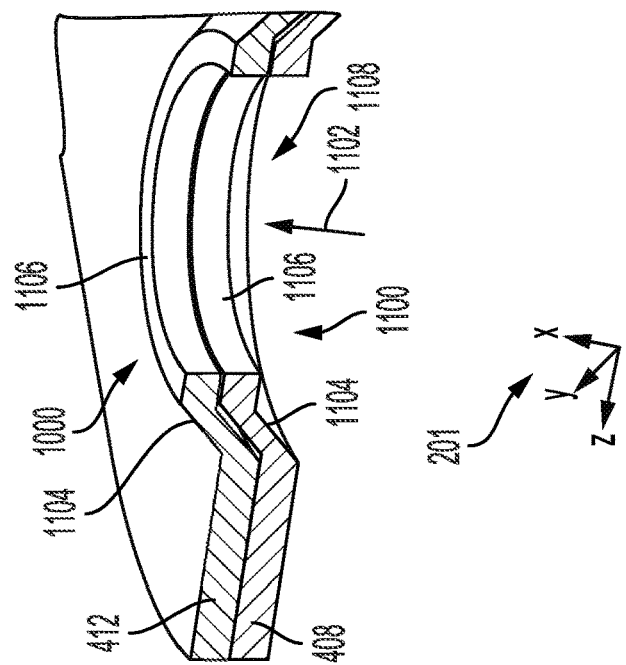
FIG. 11 shows a detailed view of mated alignment bosses in the bipolar plate assembly, illustrated in FIG. 4.

FIG. 11 illustrates a detailed cross-sectional view of the bipolar frame plate 408 mated with the membrane frame plate 412. Specifically, an alignment boss 1100 in the bipolar frame plate 408 is mated with the alignment boss 1000 in the membrane frame plate 412. The mated bosses taper in a direction 1102 to enable the efficient plate alignment. The bosses therefore each include a tapered outer surface 1104 and a flange 1106. The flanges 1106 are shown extending toward the center of the openings 1108 of the bosses. However, other flange contours have been contemplated.

Figure 12:
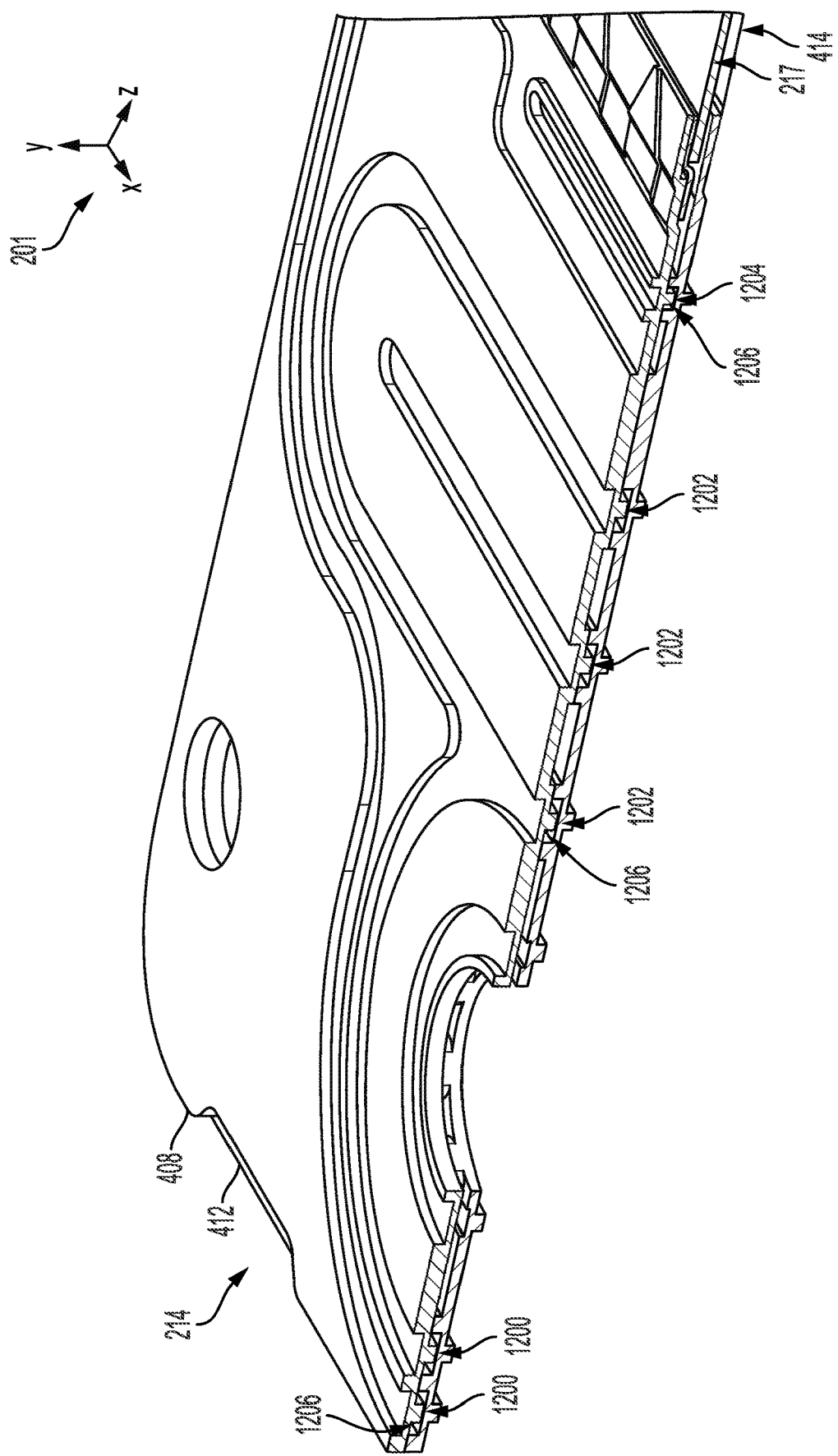
FIG. 12 shows a cross-sectional view of the bipolar plate assembly, shown in FIG. 4, with tongue and groove interfaces.

FIG. 12 shows the bipolar plate assembly 214 including mated tongues and grooves demarcating the electrolyte flow paths in the assembly. The tongue and groove arrangement may accommodate for larger plastic tolerances in the frame plates, if desired. An overboard tongue and groove interface 1200, a shunt tongue and groove interface 1202, and a distribution tongue and groove interface 1204 are illustrated in FIG. 12. The tongue and groove profile allows for space efficient connection between the bipolar frame plate 408 and the membrane frame plate 412. Additionally, the tongue and groove profile enables adhesive paths 1206 to be formed adjacent to the mated features, increasing bond strength between the membrane frame plate 412 and the bipolar frame plate 408. Therefore, prior to filling with adhesive the adhesive paths 1206 may be gaps on opposing sides of the tongues. As such, beads of a suitable adhesive (e.g., different types of epoxy and the like) may be located in the adhesive paths 1206 after bipolar plate assembly construction. However, in other examples, the distribution channels, shunt channels, and/or cross-over channels may be constructed via gas assist molding in a frame structure with both the bipolar and membrane frame plates. Thus, in such an example, the channels may be created during the molding process which may allow the use of glue or other sealing interface to be omitted from the bipolar plate assembly, if desired. Furthermore, providing molded-in electrolyte channels in the frame assembly also enables a reduction in the cell stack's parts count, if wanted, thereby consolidating the membrane frame plate and the bipolar frame plate into one continuous component (e.g., a monolithic structure).

FIG. 12 also shows the bipolar plates 217 and the membrane 414. As previously discussed, the bipolar plates 217 are coupled (e.g., heat welded, adhesively bonded, combinations thereof, etc.) to the bipolar frame plate 408 and the membrane 414 is coupled to the membrane frame plate 412. Therefore, in one example, the membrane 414 may heat welded to the membrane frame plate 412. Likewise, the bipolar plates 217 may be heat welded to the bipolar frame plate 408. It will be appreciated that heat welding produces a layer of thermally bonded material (e.g., a joint) between the two components.

Figure 13:
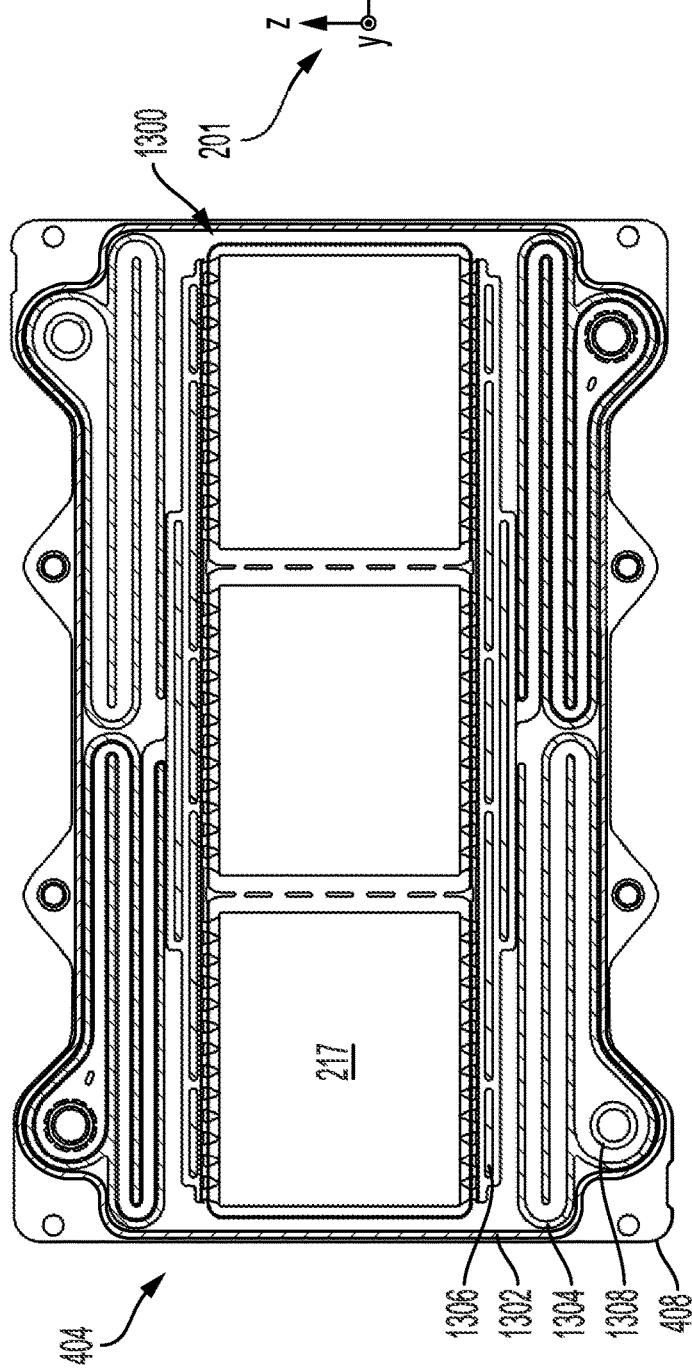
FIG. 13 shows a first side of the bipolar frame assembly in the bipolar plate assembly, illustrated in FIG. 12.

FIGS. 13-16 show detailed views of the tongue and groove features in the bipolar frame plate 408 of the bipolar frame assembly 404. Turning to FIG. 13, depicting a first side (e.g., top side) 1300 of the bipolar frame assembly 404 with the bipolar frame plate 408 and bipolar plates 217 coupled thereto. The bipolar frame plate 408 includes the groove portions of the tongue and groove interfaces, shown in FIG. 12, in the bipolar plate assembly. Specifically, an overboard groove 1302, a shunt groove 1304, a distribution groove 1306, and a cross-over groove 1308 (e.g., port groove) are illustrated.

Figure 14:
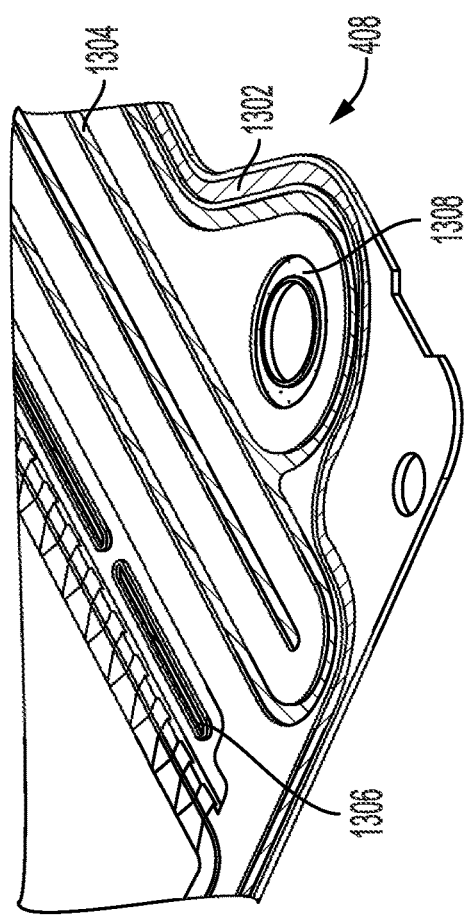
FIG. 14 shows a detailed view of a portion of the bipolar plate assembly, illustrated in FIG. 13.

FIG. 14 shows a detailed view of the bipolar frame plate 408 with the overboard groove 1302, the shunt groove 1304, the distribution groove 1306, and the cross-over groove 1308 (e.g., port tongue). It will be understood that the grooves are recesses allowing the tongues in the membrane frame plate to mate therewith to form a compact interface. Therefore, it will be appreciated that the membrane frame assemblies and specifically the membrane frame plates in the bipolar plate assembly have corresponding tongue and groove features contoured to mate with the tongue and groove features in the bipolar frame plate 408 to demarcate electrolyte flow channels therein.

Figure 15:
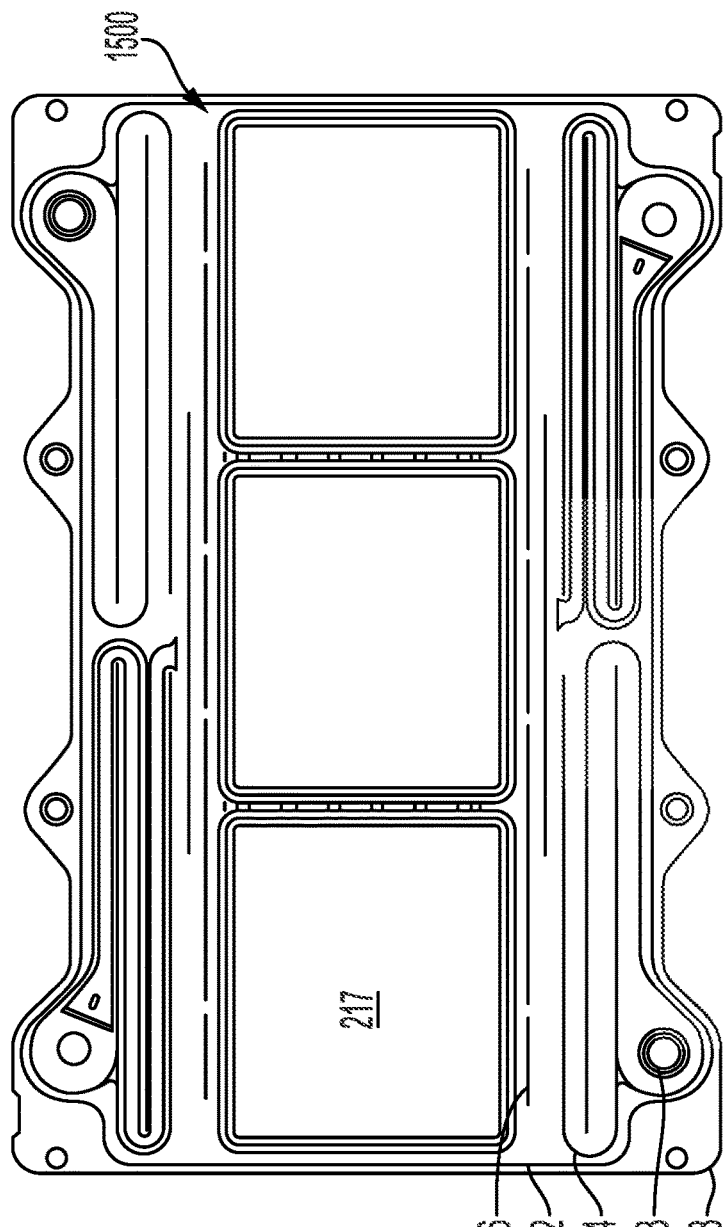
FIG. 15 shows a second side of the bipolar frame assembly in the bipolar plate assembly, illustrated in FIG. 12.

FIG. 15 shows a second side (e.g., bottom side) 1500 of the bipolar frame assembly 404 with the bipolar frame plate 408 and bipolar plates 217 coupled thereto. The bipolar frame plate 408 includes the tongue portions of the tongue and groove interfaces in the bipolar plate assembly. Specifically, an overboard tongue 1502, a shunt tongue 1504, a distribution tongue 1506, and a cross-over tongue 1508 (e.g., port groove) are illustrated. The tongues are extensions profiled to mate with grooves in adjacent membrane frame plates. When coupling the tongues and grooves a bead of adhesive may be applied at each interface to seal the different electrolyte flow channels in the bipolar plate assembly. However, in other examples, the adhesive bonding at the tongue and groove interfaces may be omitted. It will be appreciated that the overboard tongue and groove interface extends around a periphery of the bipolar plate assembly to seal the cell stack.

Figure 16:
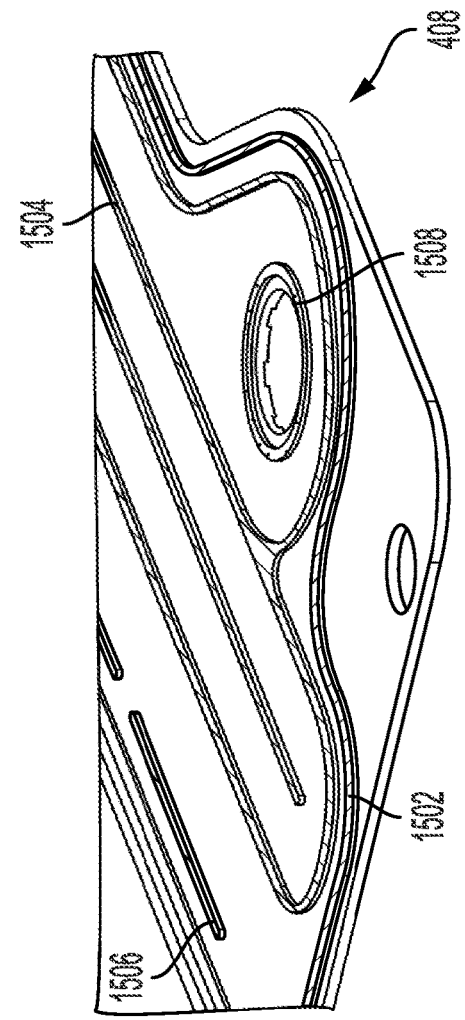
FIG. 16 shows a detailed view of a portion of the bipolar frame assembly, illustrated in FIG. 15.

FIG. 16 shows a detailed view of the bipolar frame plate 408 with the overboard tongue 1502, shunt tongue 1504, distribution tongue 1506, and cross-over tongue 1508 (e.g., port tongue) again illustrated. The tongues are extensions profiled to mate with the grooves in adjacent membrane frame plates, as previously discussed.

Figure 17:
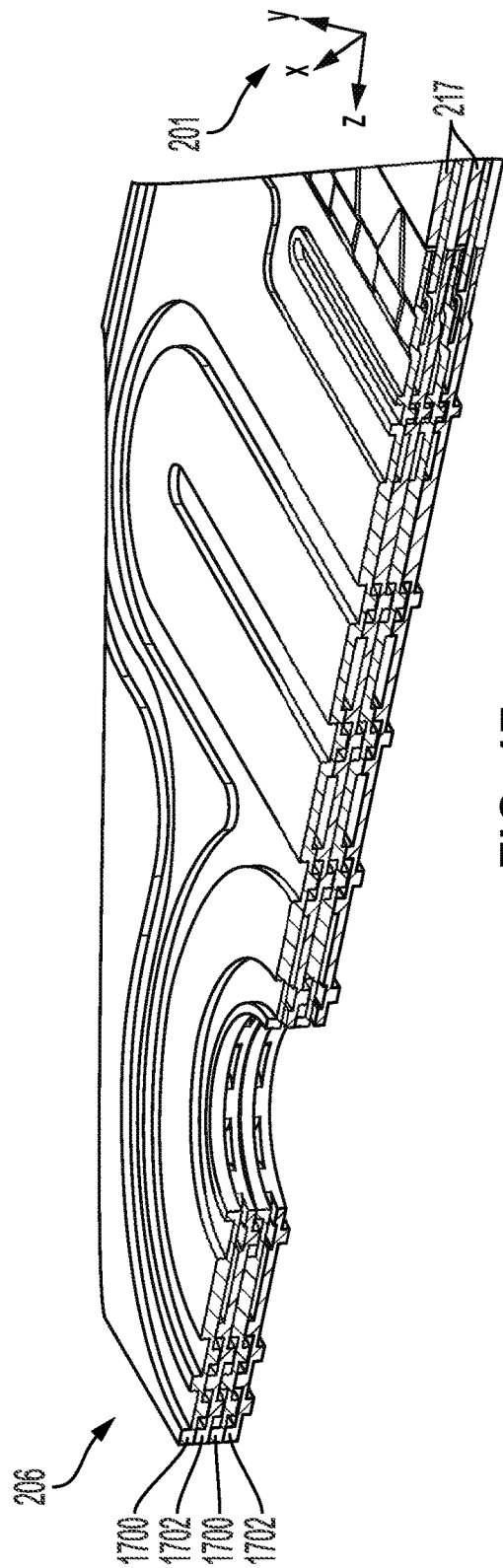
FIG. 17-18 show a cross-section of another portion of the cell stack, depicted in FIG. 4, where membrane and bipolar frame plates are mated to form negative electrolyte flow paths.

FIG. 17 shows a cross-sectional view of a portion of the cell stack 206 including bipolar frame plates 1700 and membrane frame plates 1702. As shown, the bipolar and membrane frame plates sequentially alternate in the cell stack. It will be understood that the frame plates shown in FIG. 17 may share similar features with the other frame plates described herein. As such, redundant description is omitted for brevity. The bipolar plates 217 attached to corresponding bipolar frame plates 1700, are also depicted in FIG. 17.

Figure 18:
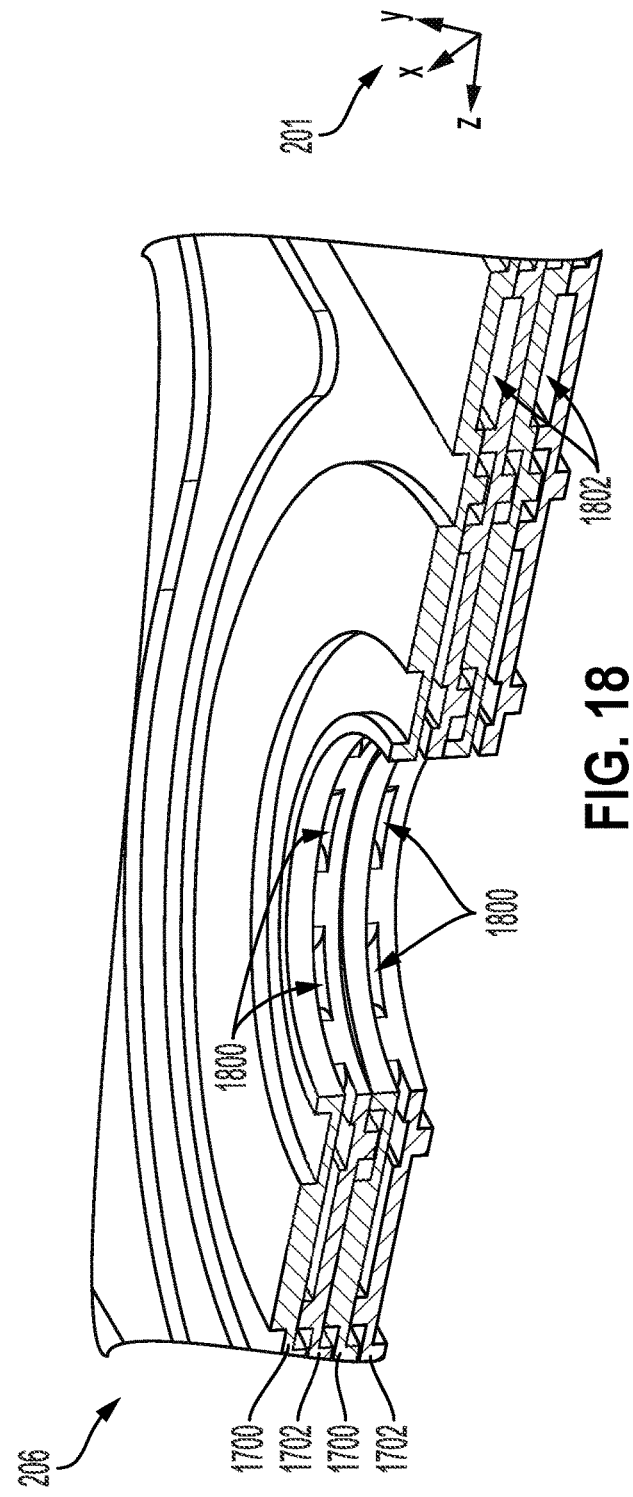

FIG. 18 shows detailed view of the cross-section of the cell stack 206 with the bipolar frame plates 1700 and membrane frame plates 1702. The interfaces between the sequential frame plates form a plurality of negative electrolyte inlets 1800 as well as a plurality of negative shunt channels 1802 in the cell stack 206. As shown, the negative shunt channels 1802 are formed via grooves in both the bipolar frame plate and the membrane frame plate to increase the cross-sectional area of the shunt channel. Consequently, the electrolyte flowrate through the shunt channel may be increased, if desired.

FIG. 19 shows a cross-sectional view of a portion of the cell stack 206 including the plurality of bipolar frame plates 1700 and membrane frame plates 1702. FIG. 19 also illustrates the bipolar plates 217 which are coupled (e.g., adhesively bonded, heat welded, etc.) to the bipolar frame plates 1700. FIG. 19 also shows an alphanumeric part indicator 1900 on one of the plate frames. However, it will be appreciated that additional parts in the stack may include parts indicators to simplify manufacturing.

FIG. 20 shows a detailed view of the plurality of bipolar frame plates 1700 and membrane frame plates 1702. The interfaces 2000 between the sequential frame plates form a plurality of positive electrolyte inlets 2002 as well as a plurality of positive shunt channels 2004 in the cell stack 206. In this way, electrolyte may be space efficiently routed through the cell stack, allowing the cell stack to achieve a more compact arrangement. As a result, battery scaling may be more cost effectively implemented, if wanted.

Figure 23:
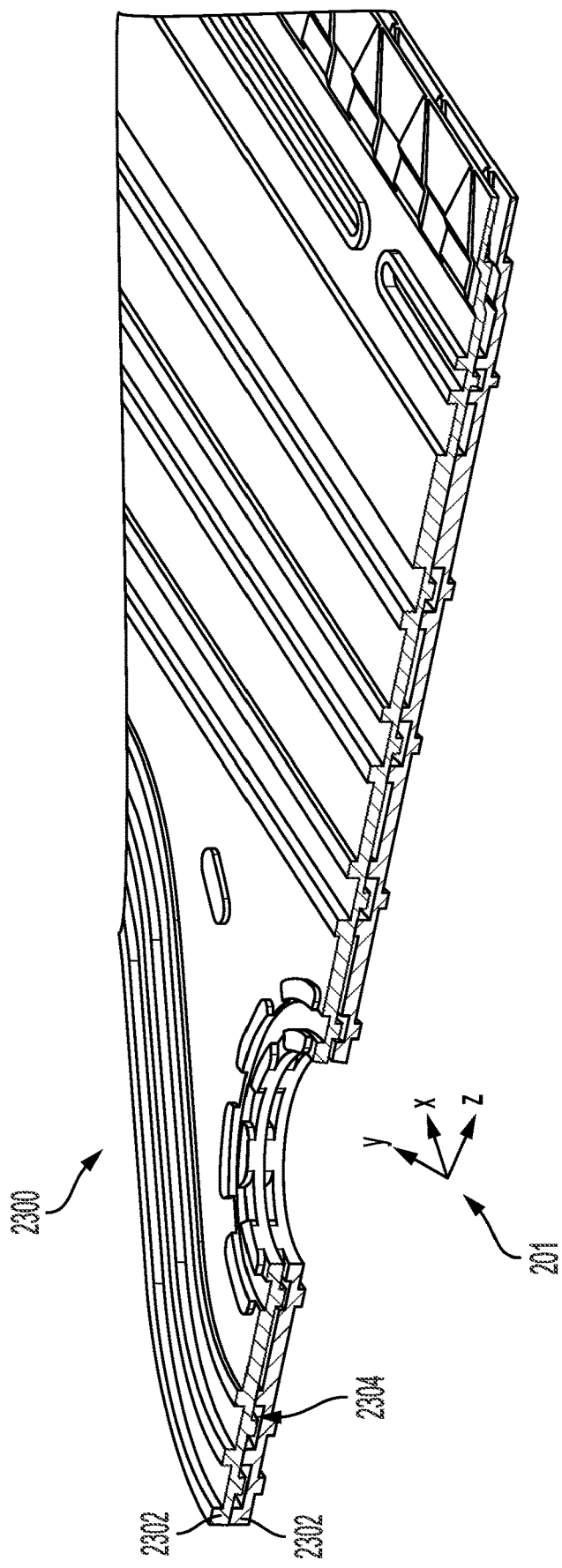
FIG. 23 shows a stack of bipolar frame plates.

FIG. 23 shows a stack 2300 of bipolar frame plates 2302 where sequential plates are mated via tongue and groove interfaces 2304. The bipolar frame plates 2302 are similar to the bipolar frame plate discussed above with regard to FIGS. 2-22. Therefore, redundant description is omitted for brevity. It will be understood that the membrane frame plates described herein may be stacked in a similar fashion. Frame plate stackability allows for increased inventory efficiency and higher packaging density with regard to cell stack manufacturing, if wanted.

The technical effect of providing a redox flow battery with a plurality of bipolar frame assemblies and membrane frame assemblies mated to form positive and negative shunt channels is to decrease the generation of shunt current in a space saving manner.

FIGS. 2-23 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will further be described in the following paragraphs. In one aspect, a redox flow battery is provided that comprises a cell stack assembly interposed by two endplates, the cell stack assembly comprising: a plurality of mated membrane frame plates and bipolar frame plates forming, at a mated interface, a plurality of negative and positive flow channels configured to distribute negative and positive electrolyte into a plurality of bipolar plates; where a membrane is coupled to each of the plurality of membrane frame plates and positioned sequentially between two of the bipolar plates included in the plurality of bipolar plates.

In another aspect, a redox flow battery is provided that comprises a cell stack assembly interposed by two endplates, the cell stack assembly comprising: a plurality of mated membrane frame plates and bipolar frame plates forming, at a mated interface, a plurality of negative and positive flow channels configured to distribute negative and positive electrolyte into a plurality of bipolar plates; where a membrane is coupled to each of the plurality of membrane frame plates; where at least one bipolar plate is coupled to each of the plurality of bipolar frame plates; and where a reinforcing mesh is positioned between one or more sequential bipolar plates and membranes.

In yet another aspect, a redox flow battery is provided that comprises a cell stack assembly interposed by two endplates, the cell stack assembly comprising: a plurality of mated membrane frame plates and bipolar frame plates forming, at a mated interface, a plurality of negative and positive flow channels distributing negative and positive electrolyte into a plurality of bipolar plates; where a membrane is coupled to each of the plurality of membrane frame plates; where at least one bipolar plate is coupled to each of the plurality of bipolar frame plates; and where a reinforcing mesh is positioned between one or more sequential bipolar plates and membranes and configured to structurally reinforce an adjacent bipolar plate and membrane.

In any of the aspects or combinations of the aspects, the cell stack assembly may further comprise reinforcing mesh positioned between sequential bipolar plates and membranes.

In any of the aspects or combinations of the aspects, where the reinforcing mesh may include a plurality of ribs distributing compressive forces through the plurality of bipolar plates and the plurality of membranes.

In any of the aspects or combinations of the aspects, each of the plurality of bipolar frame plates and the membrane frame plates may include at least two alignment bosses positioned on laterally opposing sides of the corresponding frame plate.

In any of the aspects or combinations of the aspects, an adhesive interface may be formed between mated tongues and grooves in the mated interface of each pair of membrane and bipolar frame plates and where the adhesive interface may demarcate the negative and positive flow channels.

In any of the aspects or combinations of the aspects, the adhesive interface may include adhesively filled gaps on opposing sides of the groove.

In any of the aspects or combinations of the aspects, an aspect ratio of the plurality of membrane plates may be greater than 1:3.

In any of the aspects or combinations of the aspects, the membranes may be heat welded to the membrane frame plates.

In any of the aspects or combinations of the aspects, the plurality of mated membrane frame plates and bipolar frame plates may each include openings in peripheral tabs configured to receive compression bolts.

In any of the aspects or combinations of the aspects, the cell stack assembly may include at least one visible alphanumeric part indicator on an exterior surface of the cell stack assembly.

In any of the aspects or combinations of the aspects, the reinforcing mesh layer may include a plurality of ribs interfacing with recesses in an adjacent bipolar plate.

In any of the aspects or combinations of the aspects, the mated interface may include adhesive paths bonding the membrane frame plate to the bipolar frame plate.

In any of the aspects or combinations of the aspects, the mated interface may include mated tongues and grooves.

In any of the aspects or combinations of the aspects, an aspect ratio of the plurality of membrane plates may be greater than 1:3.

In any of the aspects or combinations of the aspects, the membranes may be heat welded to the membrane frame plates.

In any of the aspects or combinations of the aspects, the plurality of negative and positive flow channels may be bounded by mated tongues and grooves and adhesive paths.

In any of the aspects or combinations of the aspects, an aspect ratio of the plurality of membrane plates may be greater than 1:3.

In any of the aspects or combinations of the aspects, the membranes may be heat welded to the membrane frame plates.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A redox flow battery comprising:
a cell stack assembly interposed by two endplates, the cell stack assembly comprising:
a plurality of mated membrane frame plates and bipolar frame plates forming, at a mated interface, a plurality of negative and positive flow channels configured to distribute negative and positive electrolyte into a plurality of bipolar plates,
where a membrane is coupled to each of the plurality of mated membrane frame plates and positioned sequentially between two bipolar plates included in the plurality of bipolar plates, and
where the cell stack assembly further comprises a reinforcing mesh positioned between sequential bipolar plates and membranes.

2. The redox flow battery of claim 1, where the reinforcing mesh includes a plurality of ribs distributing compressive forces through the plurality of bipolar plates and the membranes.

3. The redox flow battery of claim 1, where each of the plurality of bipolar frame plates and the mated membrane frame plates include at least two alignment bosses positioned on laterally opposing sides of the corresponding frame plate.

4. The redox flow battery of claim 1, where an adhesive interface is formed between mated tongues and grooves in the mated interface of each pair of membrane and bipolar frame plates and where the adhesive interface demarcates the negative and positive flow channels.

5. The redox flow battery of claim 4, where the adhesive interface includes adhesively filled gaps on opposing sides of the mated grooves.

6. The redox flow battery of claim 1, where an aspect ratio of the plurality of mated membrane frame plates is greater than 1:3.

7. The redox flow battery of claim 1, where the membranes are heat welded to the plurality of mated membrane frame plates.

8. The redox flow battery of claim 1, where the plurality of mated membrane frame plates and bipolar frame plates each include openings in peripheral tabs configured to receive compression bolts.

9. The redox flow battery of claim 1, where the cell stack assembly includes at least one visible alphanumeric part indicator on an exterior surface of the cell stack assembly.

10. The redox flow battery of claim 1, where the reinforcing mesh includes a plurality of ribs and a plurality of cross-bracings extending between the plurality of ribs.

11. The redox flow battery of claim 1, where the plurality of mated membrane frame plates and bipolar frame plates include at least a first membrane frame plate mated to a first bipolar frame plate, and where at least one of the negative and/or positive flow channels is bounded by the mated first bipolar frame plate and first membrane frame plate.

12. A redox flow battery comprising:
a cell stack assembly interposed by two endplates, the cell stack assembly comprising:
a plurality of mated membrane frame plates and bipolar frame plates forming, at a mated interface, a plurality of negative and positive flow channels configured to distribute negative and positive electrolyte into a plurality of bipolar plates;
where a membrane is coupled to each of the plurality of mated membrane frame plates;
where at least one bipolar plate is coupled to each of the plurality of bipolar frame plates; and
where a reinforcing mesh is positioned between one or more sequential bipolar plates and membranes, and where the reinforcing mesh includes a plurality of ribs and a plurality of cross-bracings extending between the plurality of ribs.

13. The redox flow battery of claim 12, where the plurality of ribs interface with recesses in an adjacent bipolar plate.

14. The redox flow battery of claim 13, where the mated interface includes adhesive paths bonding the membrane frame plate to the bipolar frame plate, and where the mated interface includes mated tongues and grooves.

15. The redox flow battery of claim 12, where an aspect ratio of the plurality of mated membrane frame plates is greater than 1:3.

16. The redox flow battery of claim 12, where the membranes are heat welded to the plurality of mated membrane frame plates.

17. A redox flow battery comprising:
a cell stack assembly interposed by two endplates, the cell stack assembly comprising:
a plurality of mated membrane frame plates and bipolar frame plates forming, at a mated interface, a plurality of negative and positive flow channels distributing negative and positive electrolyte into a plurality of bipolar plates;
where a membrane is coupled to each of the plurality of mated membrane frame plates;
where at least one bipolar plate is coupled to each of the plurality of bipolar frame plates; and
where a reinforcing mesh is positioned between one or more sequential bipolar plates and membranes and configured to structurally reinforce an adjacent bipolar plate and membrane, and where the reinforcing mesh includes a plurality of ribs and a plurality of cross-bracings extending between the plurality of ribs.

18. The redox flow battery of claim 17, where the plurality of negative and positive flow channels are bounded by mated tongues and grooves and adhesive paths.

19. The redox flow battery of claim 17, where an aspect ratio of the plurality of mated membrane frame plates is greater than 1:3, and where the membranes are heat welded to the plurality of mated membrane frame plates.

* * * * *